United States Patent
Kömmerling et al.

(10) Patent No.: US 7,005,733 B2
(45) Date of Patent: Feb. 28, 2006

(54) ANTI TAMPER ENCAPSULATION FOR AN INTEGRATED CIRCUIT

(76) Inventors: Oliver Kömmerling, Mühlstrasse 7, 66484 Riedelberg (DE); Fritz Kömmerling, Hauptstrasse 158, Hochspeyer (DE)

( * ) Notice: Subject to any disclaimer, the term of this patent is extended or adjusted under 35 U.S.C. 154(b) by 0 days.

(21) Appl. No.: 09/745,811

(22) Filed: Dec. 26, 2000

(65) Prior Publication Data
US 2001/0033012 A1 Oct. 25, 2001

Related U.S. Application Data

(60) Provisional application No. 60/173,994, filed on Dec. 30, 1999.

(51) Int. Cl.
*H01L 23/02* (2006.01)
(52) U.S. Cl. ............... 257/679; 713/190; 713/193; 713/194; 257/922; 257/787
(58) Field of Classification Search .......... 380/3, 380/4, 42; 257/679, 787, 922; 713/190, 713/193, 194
See application file for complete search history.

(56) References Cited

U.S. PATENT DOCUMENTS

| | | | |
|---|---|---|---|
| 4,593,384 A * | 6/1986 | Kleijne | 365/228 |
| 4,783,801 A * | 11/1988 | Kaule | 713/194 |
| 4,860,351 A | 8/1989 | Weingart | |
| 4,933,898 A * | 6/1990 | Gilberg et al. | 365/53 |
| 5,053,992 A * | 10/1991 | Gilberg et al. | 365/185.04 |
| 5,060,261 A * | 10/1991 | Avenier et al. | 713/194 |
| 5,117,457 A * | 5/1992 | Comerford et al. | 713/194 |
| 5,159,629 A * | 10/1992 | Double et al. | 713/194 |
| 5,177,352 A | 1/1993 | Carson et al. | |
| 5,353,350 A * | 10/1994 | Unsworth et al. | 713/194 |
| 5,539,828 A | 7/1996 | Davis | |
| 5,790,670 A * | 8/1998 | Bramlett | 380/52 |
| 6,233,339 B1 * | 5/2001 | Kawano et al. | 380/44 |
| 6,264,108 B1 * | 7/2001 | Baentsch | 235/487 |
| 6,276,609 B1 * | 8/2001 | Czar et al. | 235/492 |
| 6,396,400 B1 * | 5/2002 | Epstein et al. | 340/550 |
| 6,501,390 B1 * | 12/2002 | Chainer et al. | 340/870.16 |

FOREIGN PATENT DOCUMENTS

EP 0 743 602 A1 11/1996

* cited by examiner

*Primary Examiner*—Eugene Lee
(74) *Attorney, Agent, or Firm*—Banner & Witcoff Ltd.

(57) ABSTRACT

An integrated circuit device comprising: a circuit which uses encryption; and an encapsulation packaging layer; in which the circuit is responsive to at least one physical parameter of the encapsulation to apply the encryption and/or decryption by reading the key therefrom, so that tampering with the encapsulation to gain access to the circuit causes the encryption and/or decryption to fail.

36 Claims, 24 Drawing Sheets

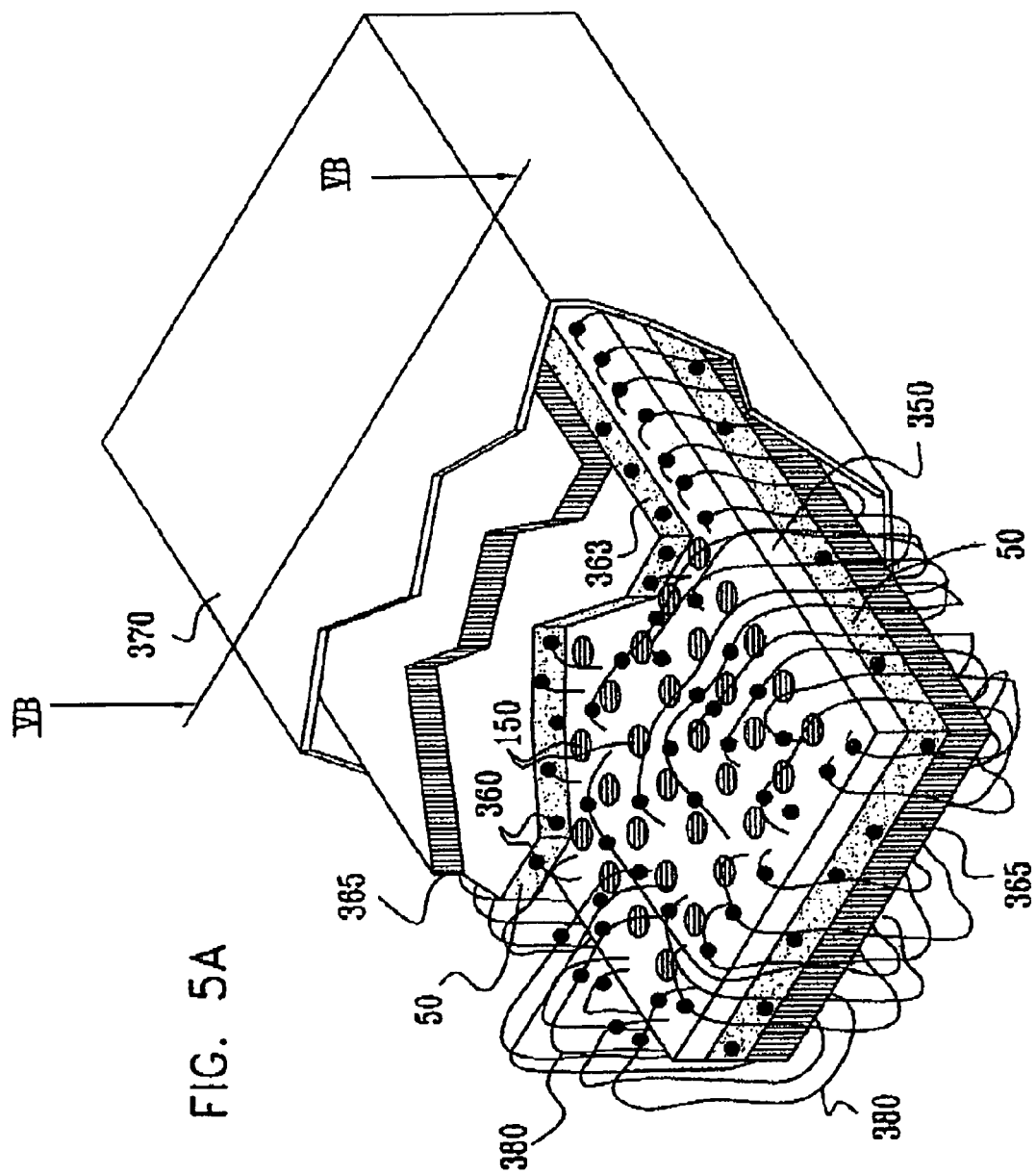

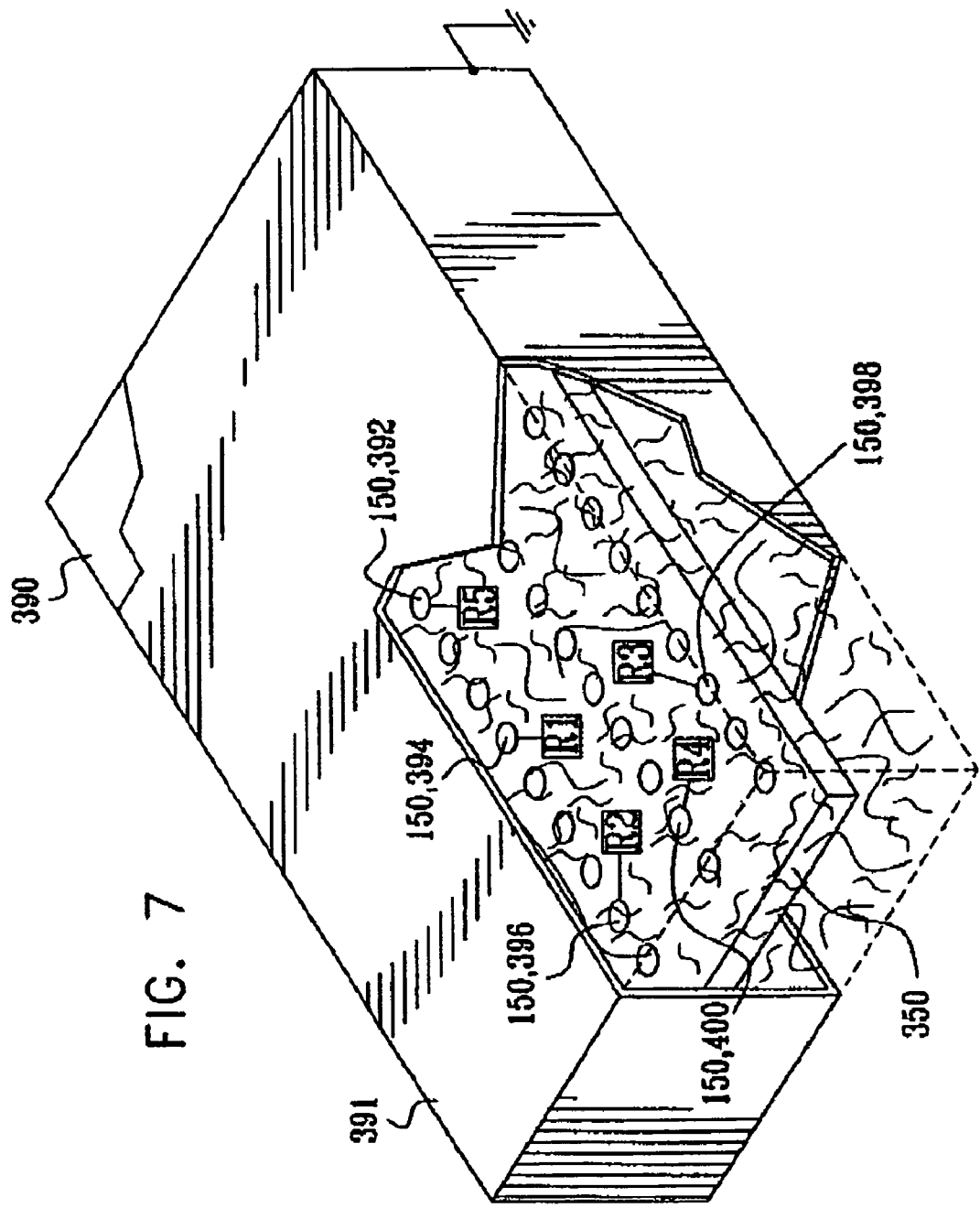

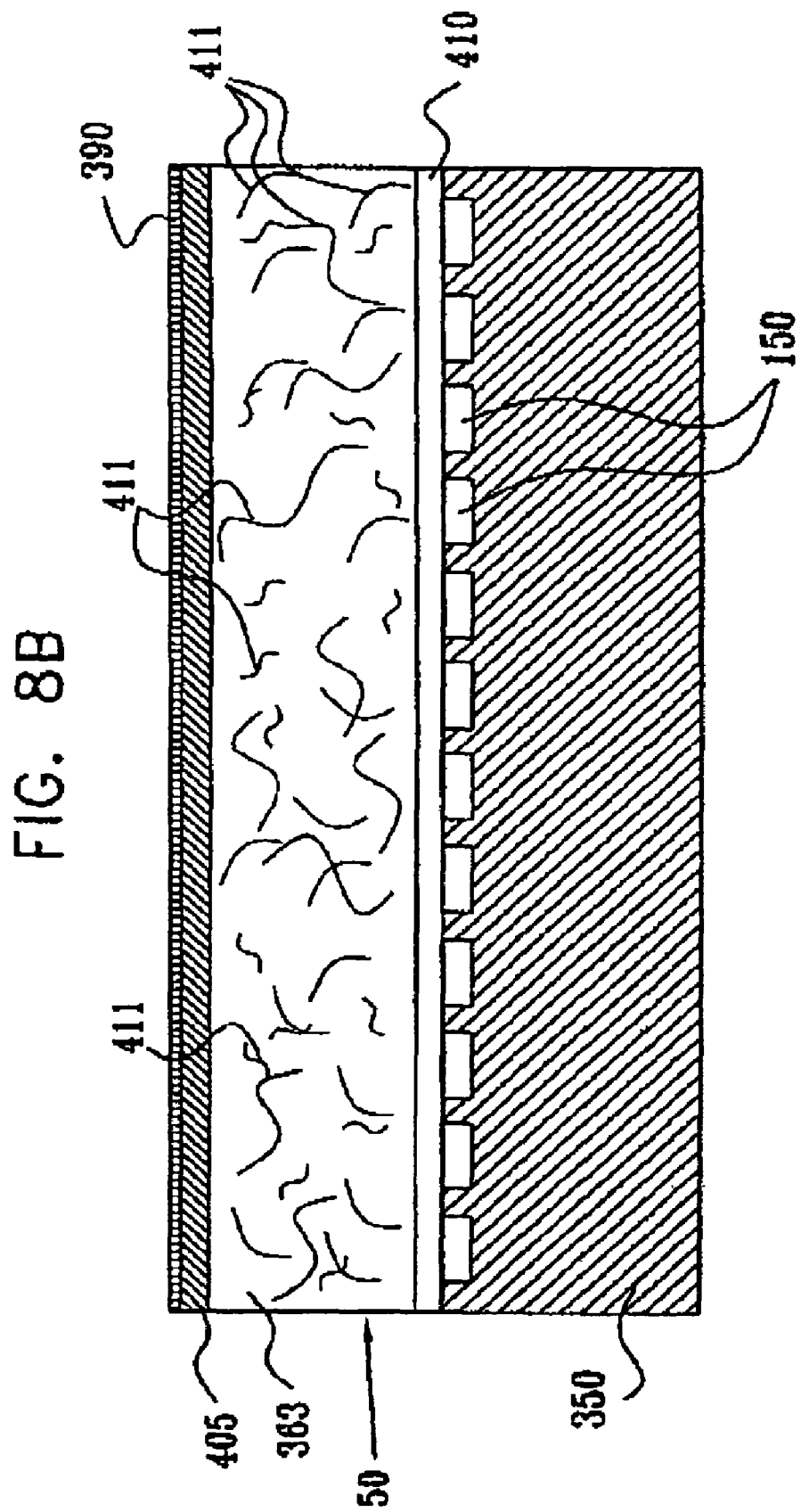

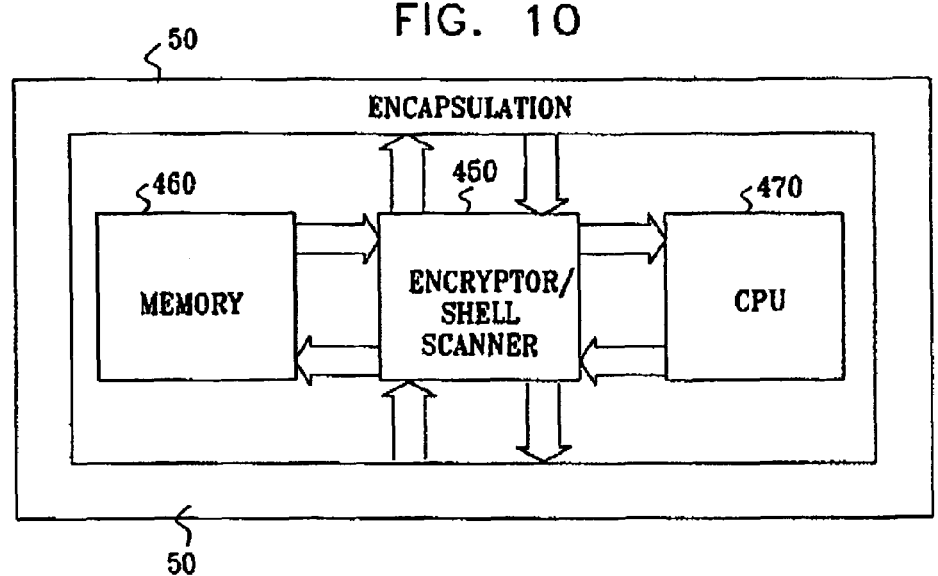
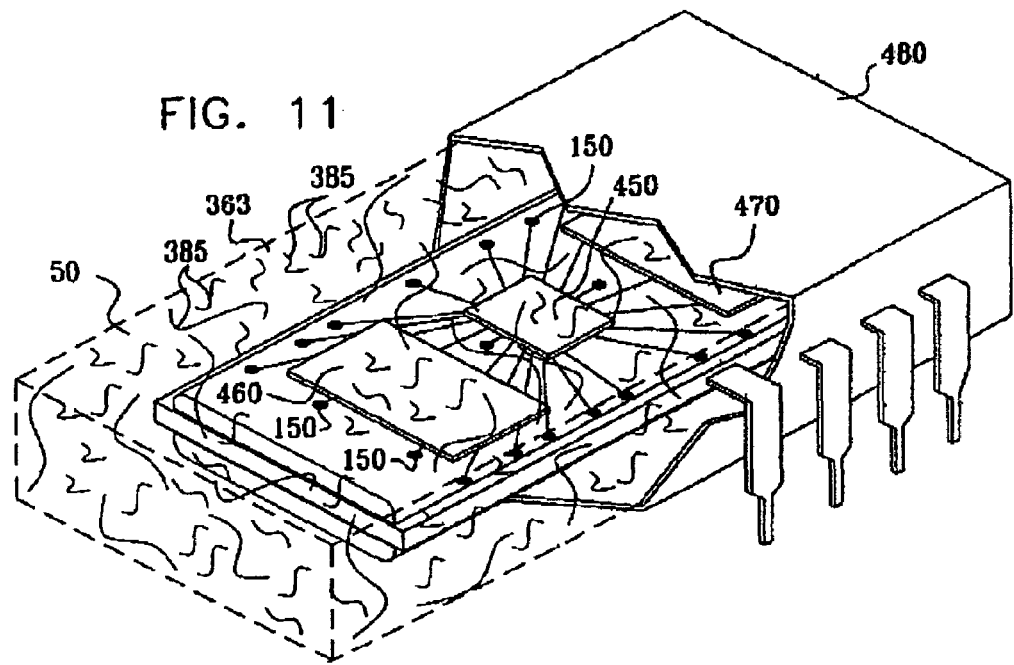

ANTI TAMPER ENCAPSULATION FOR AN INTEGRATED CIRCUIT

CROSS-REFERENCE TO RELATED APPLICATIONS

This application is related to the following U.S. Provisional Patent Application, by the present inventors, incorporated by reference herein, with priority claimed for all commonly disclosed subject matter: "Microchip Encapsulation with Encryption Key", U.S. Ser. No. 60/173,994 filed 30 Dec. 1999.

FIELD OF THE INVENTION

The present invention relates to apparatus and methods for the protection of security sensitive content (e.g. data, program or cryptographic information) stored in memory within an integrated circuit assembly (such as an electrical integrated circuit or computer chip), from tampering. Examples of such integrated circuits are smart cards, microcontrollers, microprocessors or ASICs, as used for example in electronic banking, cash machines, subscription TV, mobile phones or the like.

BACKGROUND OF THE INVENTION

Various methods of preventing tampering with integrated circuits are known. One approach is to concentrate on the encapsulation material; for example, by adding glass particles to defeat attempts to mechanically grind away the coating. However, research has shown that any chip case can be attacked by some method (for example, acids, bases, solvents, plasma or reactive ion etch, focussed ion beam, laser or mechanical milling), and that the modification of the encapsulation to resist one of these methods tend to make it weaker against others. U.S. Pat. No. 5,369,299 discloses a tamper resistant coating in which etching the covering layer will damage the active device. U.S. Pat. No. 5,916,944 discloses a tamper resistant coating in which a reactive layer is used which will react exothermically, destroying the device beneath, when exposed to oxygen (on attack).

Another approach is to attempt to detect tampering with a chip using sensors. Once tampering is detected by the sensor, some protective action may be taken. However, whilst such approaches may protect a chip in the active state, they cannot protect a chip which is without power. In such a state, the sensors and control circuit are ineffective, and the encapsulation may be removed and any stored data may be read.

SGS-Thompson are believed to provide a protective mesh layer on the surface of their chips. Any crude attempt to penetrate the mesh results in a short circuit or break. Once such a short circuit is detected, the chip function is switched off. However, as noted, the protection is ineffective when the chip is without power. U.S. Pat. No. 5,861,662 discloses a similar technique.

A completely different approach, adopted by some smart card manufacturers, is to "scramble" the contents of the chip. For example, the Philips Visa card and the Siemens SLE66C160S bank card provide internal content scrambling (encryption) of their stored data, using an encryption/decryption unit on-board the chip.

Now, even if a "hacker" or "pirate" (these terms may be used interchangeably hereafter and denote any unauthorised individual attempting to gain access) attempts to read the data from memory in the chip, it will be scrambled; to convert the data into unencrypted or "clear text" form he must reverse engineer the encryption/decryption unit on the chip and also know the encryption key.

However, since the chip itself has to hold the encryption key in order to decrypt the data, this operation is possible for a serious hacker.

Various attacks, and techniques for defending against them, are described in "Design Principles for Tamper Resistant Smart Card Processors", published in proceedings of the USENIX Workshop on Smart Card Technology (10–11 May 1999), and "Low cost attacks on tamper resistant devices", Security Protocols $5^{th}$ International Workshop Proceedings, 1997 p125–136.

SUMMARY OF THE INVENTION

The present invention seeks to provide an improved apparatus and method for protecting the content of memories in circuit assemblies (such as integrated circuits, e.g. semiconductor chips) from tampering.

In one aspect, the invention provides an integrated circuit device using a decryptor to access data stored in encrypted form; and a protective member (e.g. encapsulation or packaging) which reduces access to the circuit; characterised in that the encryption used by the circuit is responsive to at least one physical parameter of the protective member, and the protective memory is arranged so that tampering therewith to gain access to the circuit will alter the physical parameter so as to cause the encryption to function differently.

In another aspect, the invention provides a method of accessing data held in encrypted form in an integrated circuit device, including a step of deriving encryption data (such as a key) from a protective member which physically blocks access to the circuit.

Typically the protective member is a layer over and/or around the circuit, such as an encapsulation layer.

In a further aspect, the present invention comprises a circuit, with packaging substantially enclosing the circuit and designed in such a way that it participates in cryptographic protection of the circuit such that if the packaging is disturbed, normal function of the circuit cannot take place.

Thus, because data essential to the encryption or decryption is derived from the protective layer itself, any attempt to strip away the protective layer to reach the circuit beneath has the effect of destroying the data (e.g. a key to a cryptographic algorithm) needed to decrypt the content held within the circuit.

By providing that the key is derived from a physical parameter of the member (e.g. coating), rather than (for example) being held within a register within it, it is not possible for the value of the key to be read part way through stripping the coating.

Preferably, the physical parameter or physical parameters are sensed, and result, from areas of the protective member which are dispersed across or around the integrated circuit. Thus, for example, the physical parameter may be a bulk or surface parameter, or it may result from a number of inhomogeneities discontinuities such as dispersed particles.

In this case, attempts to drill small holes through the protective member (for example to read address lines or data lines of the chips) are defeated, since in the case of bulk or surface properties the parameter will be altered wherever such a hole is drilled; and in the case of dispersed discontinuities, the spacing between areas sensed is on the order of the width of the minimum hole which can be drilled.

Preferably, the physical parameter(s) is chaotic or random from one device to another, which may be as a result of the manufacturing process being chaotic or random (e.g. such as not to determine the position of inhomogeneities). Thus, the encryption data (e.g. key) will be unique to each device and known only to that device, so that it is not possible to steal encryption data from a central source and use it on all devices, or to defeat the protection of one device and then use the encryption data on another.

As a consequence, in this embodiment, the circuit has an initialisation mode, in which the parameter is read, and the data to be held on the device is initially encrypted in dependence upon the value of the parameter.

In one embodiment, the content is held in an electrically alterable memory, so as to permit it to be rewritten in encrypted form.

In another embodiment, the data on all devices is stored in a first encrypted form in a memory (which may be non alterable such as mask programmed ROM). The first encrypted form is predetermined and does not depend upon the protective memory. The key to the first encryption is held in an alterable memory (for example an electrically alterable memory) and during the initialisation process, this key is encrypted in second encrypted form, the second encryption being derived responsive to the physical parameter, and stored in that form in the alterable memory. Subsequently, to read data from the ROM, the first key is decrypted using the second key, and then the first key is used to decrypt the data.

Additionally, or alternatively, to ensure that the encryption data differs from device to device, the sensor or sensors for the different devices are selected from a batch having a wide tolerance (i.e. in this context low specified accuracy in manufacturing the sensors), so that the sensor readings for a given parameter value will vary from device to device (although those for a given device are to be stable over time).

Thus, even if it were possible accurately to measure the physical parameter value sensed by the sensors, the sensor response thereto (and hence the encryption data) would not be evident.

Preferably, the material making up the bulk or the surface of the protective member (e.g. encapsulation) is inhomogeneous, and preferably the distribution of the inhomogeneity is chaotic or random within each device, so that it is not possible to predict the physical parameter(s) by studying only the portion of the protective memory.

The above described embodiments are effective in protecting the chip against attack when no power is supplied to the chip. To additionally protect the chip in the powered up condition, additional measures may be desirable. For instance, the physical parameter may be scanned from the protective member at relatively frequent intervals (more frequent than the minimum time which would be taken to pierce or remove the protective member). On noting a change in the value, action could be taken to erase the secure content (i.e. encrypted data) held on the chip or otherwise disable the chip, as in the prior art.

Preferably, the encryption data derived from the physical parameter is held in fluctuating form (e.g. toggled or circulated) so as to prevent attacks based on "freezing" the store in which it is buffered.

There is a possibility that drilling a small hole through the protective member might only destroy a portion of the encryption key, leaving other portions available to be read by the attacker who might then conduct a "brute force attack" to crack the encryption. To guard against in one embodiment, a random key is provided stored within the circuit and a second key is read from the protective member as described above. The decryption key used to encrypt or decrypt data is produced as a joint function of these two keys (for example a logical combination such as an XOR combination).

If the scanning operation indicates the loss of part or all of the key derived from the physical parameter, the circuit erases the random key stored within it. Thus, even if the remainder of the key derived from the protective member is reconstructed by the hacker, the actual key necessary to decrypt the stored content (which is a result of a joint function of the now erased random key and the key derived from the protective member) cannot be reconstructed.

Preferably, the scan is in a randomly permuted order from scan to scan, and the encryption key is generated as an order-dependent function of the scanned values. Thus, the scanned sequence from the sensors will not be in an order which corresponds to that in which the sensor values contribute to the encryption key. Thus, where such an attack has resulted in the loss of some bits of the scanned values, the attacker cannot trace where the lost bits lie within the sequence used to generate the decryption key. This greatly increases the difficulty of mounting a brute force attack on the key, since although the remaining bits of the sequence are known, their order is not.

The physical parameter (used in a broad sense to indicate any property which can be sensed) may be optical, electrical, magnetic or selected from a wide range of other possibilities as will be disclosed in greater detail below.

Other embodiments and preferred features of the invention, together with corresponding advantages, will be apparent from the following description and claims.

BRIEF DESCRIPTION OF THE DRAWINGS

Embodiments of the invention will now be illustrated, by way of example only, with reference to the accompanying drawings in which:

FIG. 5A is a simplified pictorial illustration of a magnetic sensor embodiment;

FIG. 7 is a pictorial illustration of a second electrical sensor embodiment;

FIG. 8B is a cross-sectional illustration of the apparatus of FIG. 8A, taken at line VIIIB—VIIIB;

FIG. 10 is a block diagram illustration of an electrical circuit assembly constructed and operative in accordance with an alternative embodiment;

FIG. 11 is a cutaway view of one possible implementation of the apparatus of FIG. 10;

DESCRIPTION OF FIRST PREFERRED EMBODIMENT

Figure 1A:
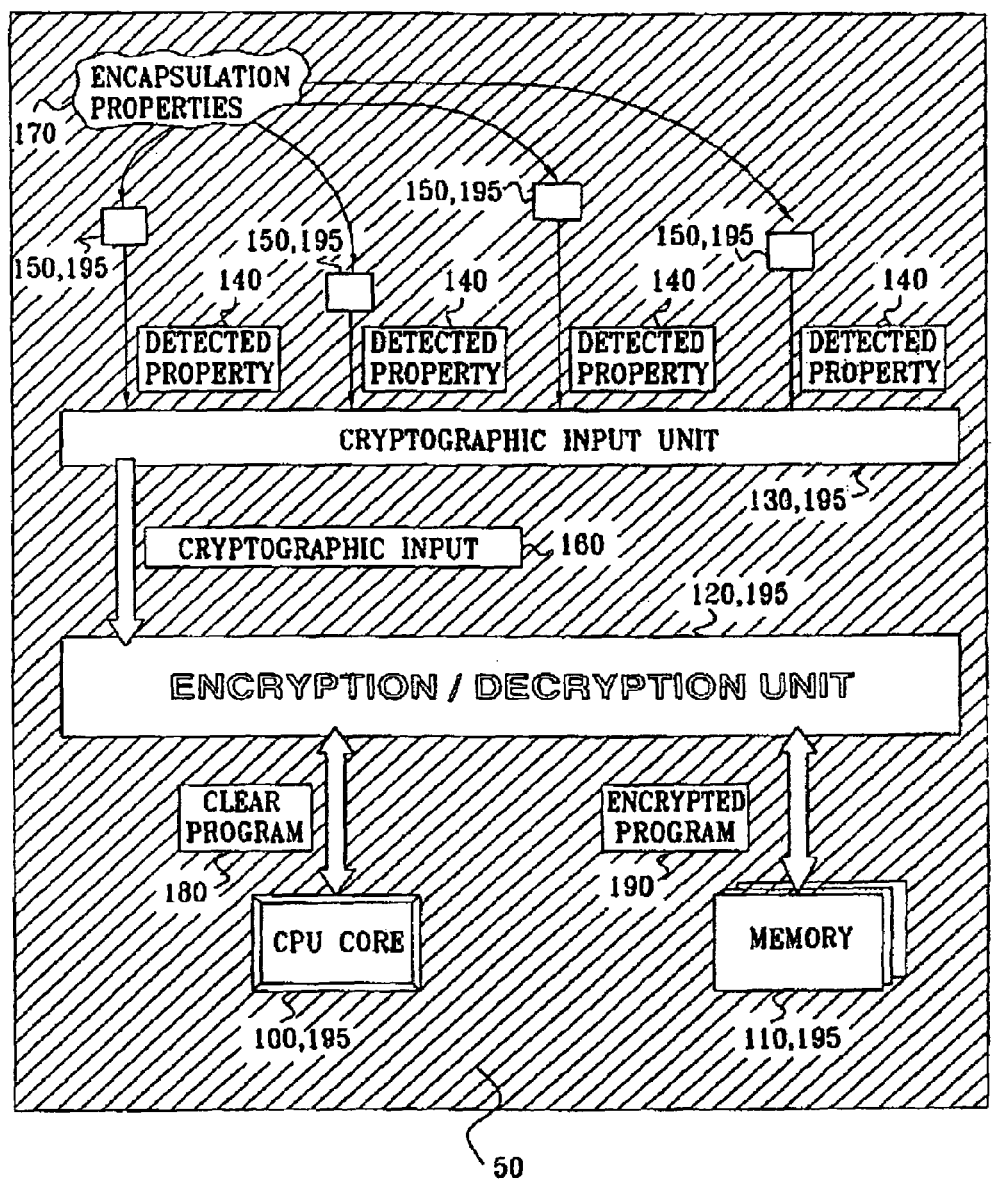
FIG. 1A is a block diagram of an electrical circuit assembly constructed and operative in accordance with a first embodiment of the present invention.

FIG. 1A shows a simplified block diagram illustration of a first embodiment.

The apparatus of FIG. 1A comprises a central processing unit (CPU) 100, which might be a standard CPU core such as the Motorola 6805/8051/6811 or Intel 8051.

The apparatus further comprises a non-volatile (NV) memory 110 which, in this embodiment, is alterable (it is for example FLASH or EEPROM or ferro electric random access memory (FERAM)). The memory 110 comprises a region storing secret content data, the content of which is to be kept secret from hackers, which may comprise for example passwords, cryptographic key data, encryption or decryption programs, digital signing programs or digital signature verification programs.

Also provided is an encryption/decryption unit (EDU) 120. The CPU 100 accesses the memory 110 by sending read and write requests through the EDU 120. The EDU uses, for example, DES, 3DES, IDEA or TEA encryption algorithms, well known in the art, or any other convenient ciphering algorithm.

The encryption/decryption unit 120 operates to encrypt and decrypt using an encryption key 160 provided from a cryptographic input unit 130. The cryptographic input unit 130 is operative to form the key 160 from a plurality of detected property outputs 140 of a corresponding plurality of sensors 150 which are responsive to the encapsulation properties 170 of an encapsulation 50 surrounding the circuit.

It is convenient at this point to summarise the operation of this embodiment with reference to FIG. 1A. In operation, the sensors 150 sense respective values of the parameter 170, and generate corresponding detected property output signals 140 which are combined in the cryptographic input unit 130 to provide the cryptographic input (key) 160. This is supplied to the encryption/decryption unit 120. The operation of scanning the sensors and supplying the cryptographic input 160 takes place at least every time power is supplied to the chip, and (in this embodiment) at regular intervals during power-on operation.

The CPU core 100 requests successive program instructions and data from the memory 110. Rather than being directed to the memory 110, each request is directed to the encryption/decryption unit 120. The address lines of the memory 110 having been selected, a word of content (program or data) in encrypted form (190) is supplied from the memory 110 to the encryption/decryption unit 120. The encryption/decryption unit 120 decrypts the word of encrypted content 190 and supplies a corresponding decrypted or clear text word to the CPU core 100 for processing. The encryption/decryption unit 120 thus acts essentially transparently between the CPU 100 and memory 110.

In the event of tampering with the encapsulation 50, the encapsulation properties 170 are altered, leading to alterations in the detected properties 140 and hence the cryptographic input (key) 160. As a result, encryption/decryption unit 120 no longer correctly decrypts programs and/or data from the memory 110 and the CPU core no longer operates normally.

Further detail on this embodiment will now be given with reference to FIG. 1B. In this embodiment, an integrated circuit or microchip 195 is manufactured, comprising the CPU core 100, memory 110, encryption/decryption unit 120, cryptographic input unit 130, and sensors 150. An acquisition logic circuit 197 (not shown in FIG. 1A) acquires the detected property signals 140 from the sensors 150.

Also provided is an input/output circuit 210, connected to contact pads (not shown) which enable the circuit 195 to connect to external apparatus. The contact pads enable connection in use of the encapsulated device to other apparatus such as a card reader. In this embodiment, they also allow connection after fabrication of the device to test apparatus such as, for example, probe pads. Finally, an initialisation circuit 200 is provided. The initialisation circuit comprises a Read Only Memory (ROM) storing a loader program comprising a first part for loading an initial key, and a second part encrypted in a first encrypted form under the initial key.

Figure 14:
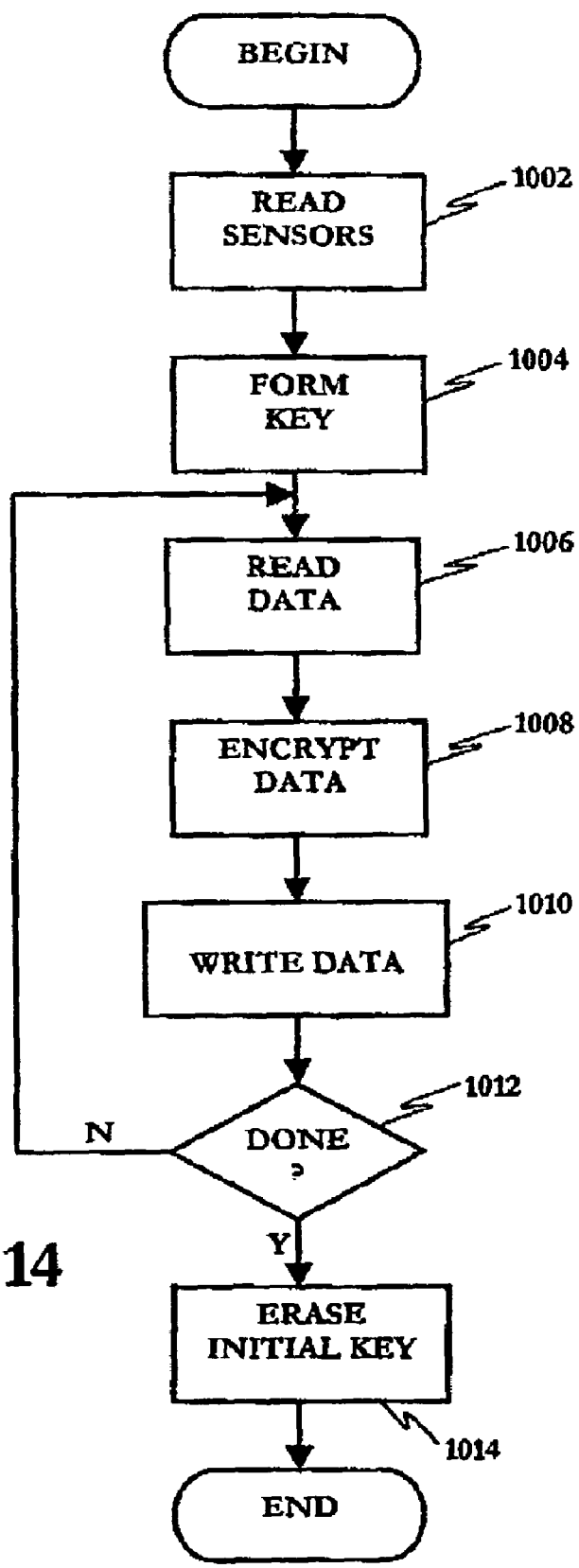
FIG. 14 is a flow diagram indicating the initialisation process performed by the first embodiment.

Referring to FIG. 14, in the initialisation process, in the factory, on first powering on the chip, the first part of the loader program is performed and an initial key is supplied via the I/O circuit 210. Using the initial key to decrypt the contents of the ROM, the second part of the loader program is executed. In a step 1002, the loader programs reads the detected property signals 140 from the sensors 150. In a step 1004, the acquisition logic 197 and cryptographic input unit 130 form a key from the detected property signals 140.

Next, the loader program performs a loop in which, until all the secure data in the secure data storage region in the memory 110 is stored (step 1012), a word of data is read from the I/O circuit in step 1006; encrypted "on the fly" by the encryption/decryption unit 120 in step 1008; and written to the memory 110 in step 1010.

Finally, in step 1014, the loader program causes the initial key to be erased, leaving the second part of the loader program in encrypted form in the initialisation circuit, to prevent reinitialisation of the circuit. Since only the manufacturer knows the initial key, no one else can use the second part of the loader program, and the first part is valueless unless the initial key is known, since loading any other key will not decrypt the second part of the loader program.

Incidentally, it is noted that this process of disabling the loader program could also be used in known encrypted circuit devices, not utilising the principle of encryption derived from the encapsulation as in this embodiment.

Thus, after operation of the initialisation process of FIG. 14, the secret content data stored in the memory 110 can only be accessed by decrypting through the encryption/decryption unit 120 using the key 160.

Additionally or alternatively, rather than supplying all the data as a datastream through the input/output unit, it could be supplied initially in the memory 110 in the clear and then overwritten during initialisation.

Operation of the Device

Figure 15A:
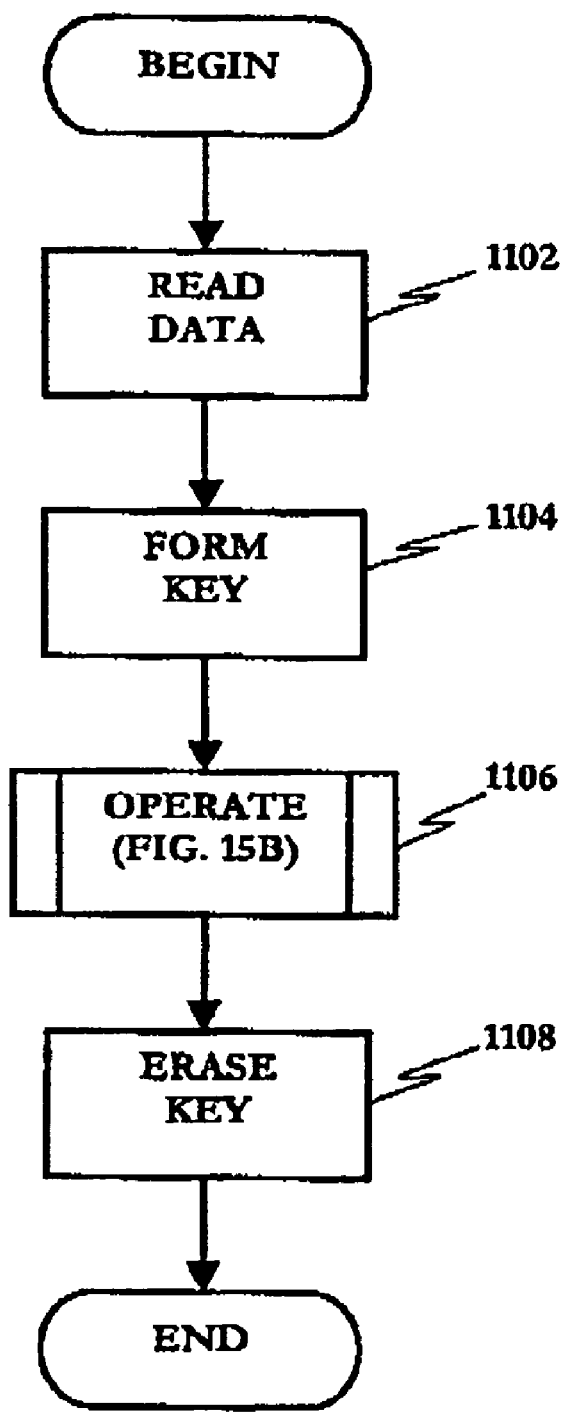
FIG. 15A is a flow diagram indicating the operating process of the device.

In use, referred to FIG. 15A, on powering up, the circuit is arranged to read the detected property data 140 in step 1102 and to form a key as before in step 1104 (corresponding to step 1002 and 1004 discussed above). In step 1106, the device performs its operating cycle, which will be described with reference to FIG. 15B. When power is removed, in step 1108 the registers in the encryption/decryption unit 120 and cryptographic input unit 130 are flushed to erase the key. Operation then ceases.

Figure 15B:
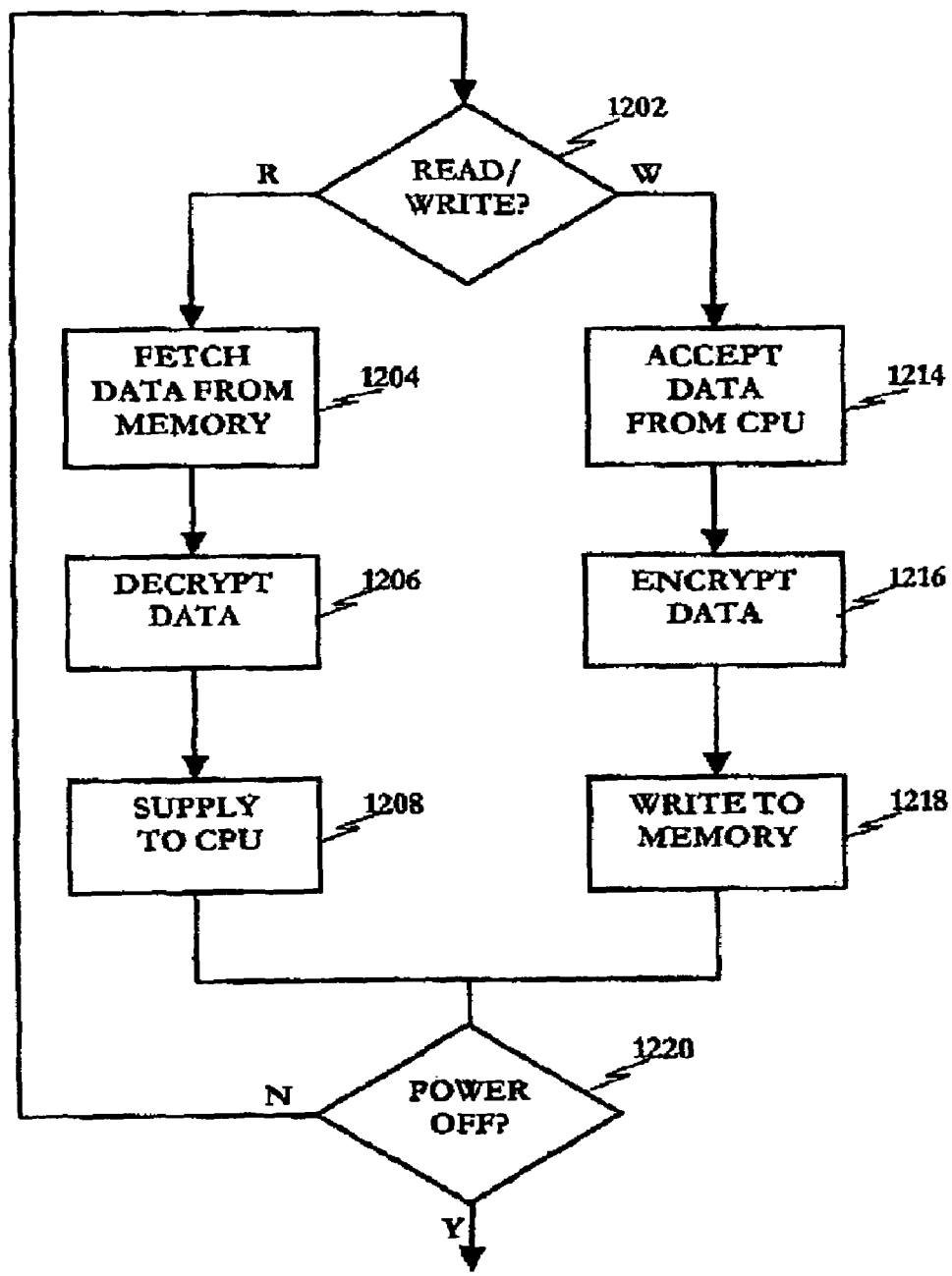
FIG. 15B is a flow diagram indicating in greater detail a portion of that process.

Referring to FIG. 15B, in operation, the CPU 100 performs its operating program, in accordance with signals received from the input/output circuit (e.g. instructing reading or writing of data).

The encryption/decryption unit 120 detects when a read or write instruction to the secure storage region of the memory 110 is to be performed by the CPU 100 in step 1202. If the instruction is a read instruction, then in step 1204, the corresponding word is received from the memory 110 and decrypted in step 1206 and supplied to the CPU in step 1208.

If the corresponding instruction is a write instruction, then in step 1214, the EDU circuit 120 accepts a word of data from the CPU 100, encrypts it (step 1216) and writes it to the memory (step 1218).

After step 1208 or 1218, in step 1220 an assessment is made as to whether a power down condition is occurring (e.g. by running an interrupt service routine on the CPU 100) and, if so, the operating cycle 1106 ceases.

The CPU 100 may be arranged to accept a new program through the input/output circuit. As an additional security feature, in this case, the device is arranged to execute a hardwired reset, to erase all data in the memory 110 prior to running the new program. Thus, it is possible (in the factory) to load a test program, or to reinitialise the circuit with a new initialisation program, but only on resupplying the contents of the memory 110, so that a hacker cannot supply an illicit program to read or otherwise use the contents of the memory 110 via the CPU 100.

Figure 2:
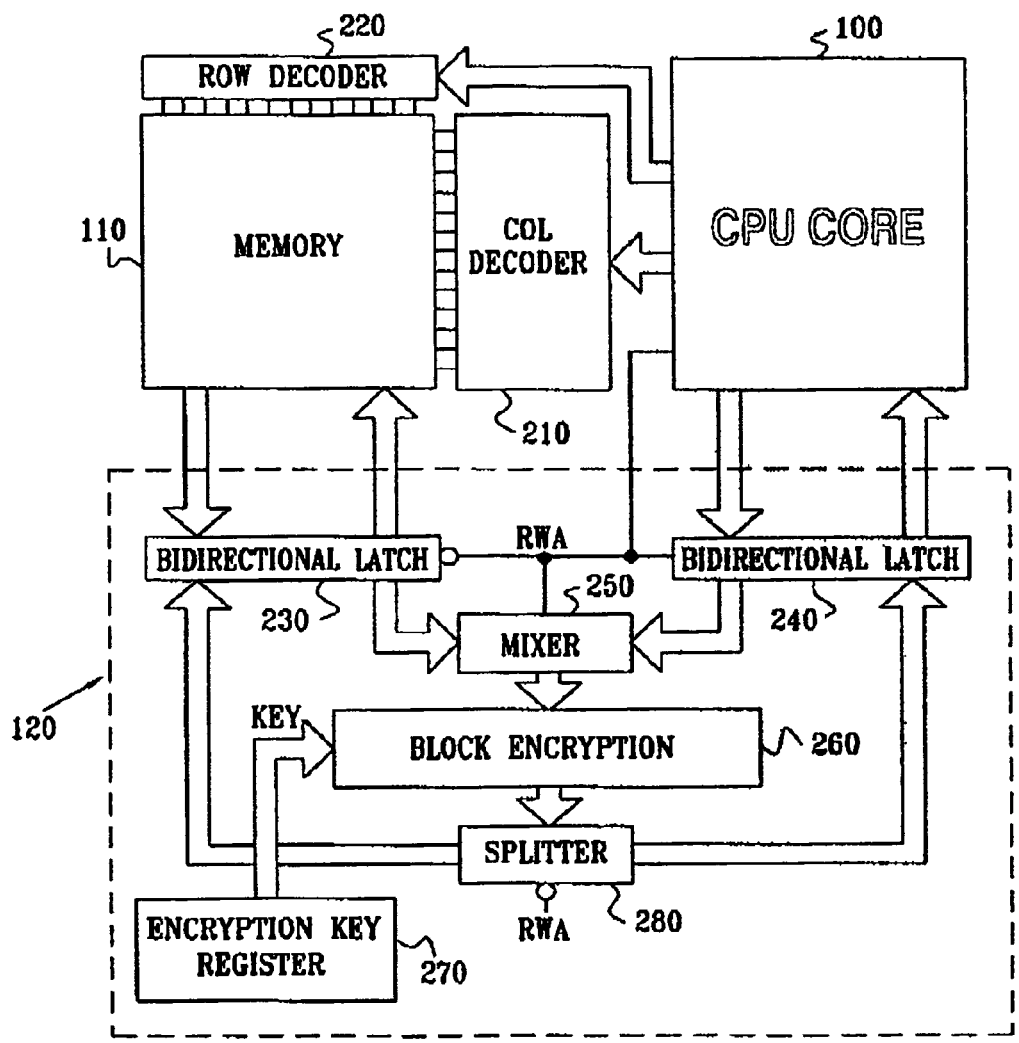
FIG. 2 is a block diagram of a preferred implementation of an encryption portion of the apparatus of FIG. 1B.
Figure 3:
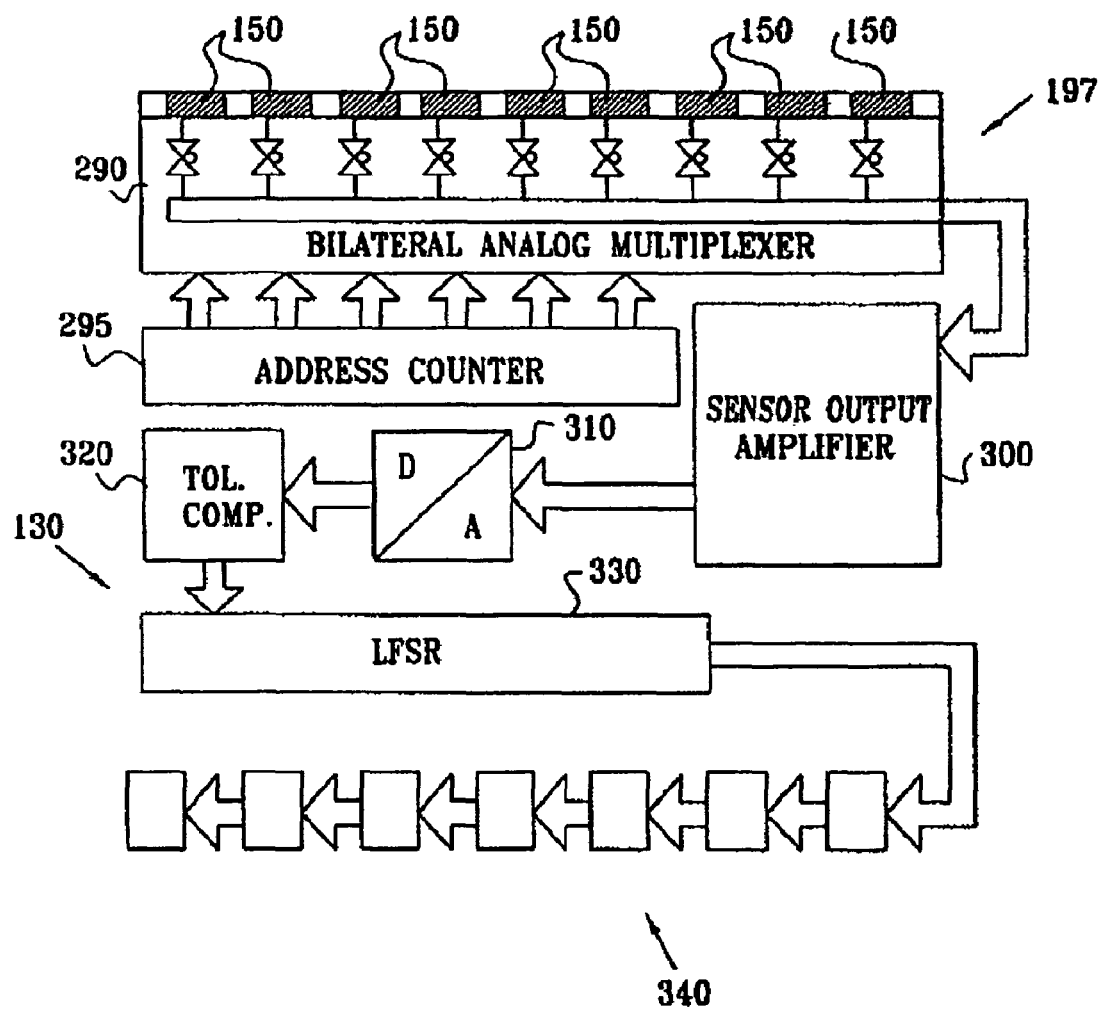
FIG. 3 is a block diagram of a preferred implementation of a sensor circuitry portion of the apparatus of FIG. 1B.

Further details of a preferred implementation of this embodiment will now be disclosed with reference to FIGS. 2 and 3.

The memory 110 is addressed by a conventional column decoder circuit 210 and row decoder circuit 220, driven from the address bus (not shown) of the CPU core 100. In this diagram the encryption/decryption circuit 120 of the previous diagrams is relabelled 260, and a key retaining register of the crypto input unit 130 is labelled 270.

In this embodiment, a first (word-wide) bi-directional latch 240 is positioned between the data bus of the CPU core 100 and the encryption/decryption circuit 260, and a second (word-wide) bi-directional latch 230 is positioned between the data bus of the memory 210 and the encryption/decryption circuit 260. In this embodiment, words are 8 bytes (64 bits) long.

A mixer circuit 250 comprises a bidirectional register coupled to the input port of the encryption/decryption circuit 260, and the two inputs of the mixer 250 are connected to the output ports of the latches 230, 240, so as to be able selectively to route data from one or the other to the encryption/decryption circuit 260.

Similarly, a splitter circuit 280 (i.e. a bidirectional register) is connected to the output port of the encryption/decryption circuit 260 and to the input ports of the latches 230, 240.

The mixer and splitter circuits 250, 280 and the latches 230, 240 are all coupled to the read/write control pin of the CPU 100; however, the signal is inverted by inverters (not shown) on the latch 230 and splitter 280. Thus, when the latch 230 is enabled in one direction, the latch 240 is enabled in the other and vice versa; and when the mixer 250 is controlled to route from the latch 230, the splitter 280 is controlled to route to the latch 240, and vice versa.

When the CPU wishes to read data from the memory 110, the latch 230 is arranged to receive data from the memory 110 and the latch 240 is arranged to receive data from the splitter 280; the mixer 250 is arranged to receive data from the latch 230 and supply it to the encryption/decryption circuit 260 which is arranged to decrypt it; the splitter 280 is arranged to route it to the latch 240 which is arranged to supply it to the CPU 100.

Conversely, when the CPU 100 is to write to the memory 110, the latch 240 is switched to receive data from the (data bus, not shown, of the) CPU 100 and the mixer 250 is switched to route the data from the latch 240 to the encryption circuit 260 for encryption, and the splitter 280 to route the encrypted data from the latch 230 which is arranged to supply it to the memory 110.

To read a byte of data in this embodiment, the CPU places the row and column addresses on the data bus of the memory 110, which forwards the desired word to the latch 230. The mixer 250 forwards the word to the encryption/decryption circuit 260, which decrypts it. The splitter circuit (under the control of the row decoder 220), forwards the decrypted word to the latch 240 from which it is routed to the CPU 100.

To execute a write cycle, the bidirectional latch 240 receives the word to be written from the (data bus of the) CPU 100, and supplies it via the mixer 250 to the encryption/decryption circuit 260 at which it is encrypted. It is then routed, via the splitter 280, to the latch 230 and then to the (data bus of the) memory 110.

The encryption unit 120 shown in FIG. 2 also includes additional control logic (not shown) for executing the functionality described above. Preferably, the encryption/decryption circuit 120 is supplied in self timed logic, rather than being driven from the CPU clock, so as to be able to operate faster than the CPU and hence to make the encryption/decryption process as fast as the available clock speed on the integrated circuit.

It is preferred, in order to make the encryption strong, to encrypt in blocks of data of 64 bits or more using a 64 bit key (shorter blocks are possible but less well protected).

If the invention is to be performed using a processor 100 having a word length less than 64 bits (for example an 8 bit/1 byte data bus processor), then the above described embodiment is altered slightly, so that a block of at least 64 bits is always read and decrypted, or encrypted and written, together.

To read a desired byte of data in this case, an entire column (64 bits) of data is read at a time from the memory, and decrypted together as a single block, and then the desired byte of the decrypted data is selected from it using the row address, and forwarded to the data bus of the CPU 100.

To execute a write cycle in this case, it is first necessary to execute a read cycle. Thus, the entire column of data from the memory 100 including the byte to be overwritten (indicated by the row decoder) is read and forwarded to the encryption/decryption circuit 260 at which it is decrypted. The desired byte to be written to memory 100 is then read from the data bus and substituted into the decrypted column. The column (with the substituted byte) is then re encrypted by the encryption/decryption circuit 260 and written back to the memory 110.

Referring to FIG. 3, the structure of the sensors 150 and acquisition logic 197 is described in greater detail.

The sensors in this embodiment can be any of the types described in the following description. In general, each gives an analogue output. The analogue sensors outputs are coupled to respective input ports of a bilateral analogue multiplexer 290 which is controlled from an address counter 295. The analogue multiplexer may, for example, be a one to n selector where n is the number of sensors.

The analogue values 140 from the sensors are then supplied one at a time, under the control of the address counter 295, through the analogue multiplexer 290 to the input of a sense amplifier 300, the output of which is supplied to an analogue to digital converter (ADC) 310. The ADC output is then corrected by a tolerance compensation circuit 320, responsive for example to a thermistor or other temperature sensor (not shown), to correct each digital sensor reading for the effect of temperature (or other environment factors) in accordance with some predetermined correction scale. (It would, of course, be possible to effect analogue compensation prior to digital to analogue conversion if required.).

The successive digital sensor readings are then loaded into a linear feedback shift register (LFSR) 330 which combines them according to some scrambling function and produces a key 340 of the required length (e.g. 64 bits) using all sensor readings, in some logical combination.

As many as on the order of one million sensors may be used Accordingly, it is desirable to derive the key from all of the sensor readings. One way is to add up the readings, or to add up readings from specific groups of sensors (such as all sensors in a column of an array). The result is a sum, which is independent of the order of scanning of the sensors making it up, but which is altered if the value of any sensor output changes.

Another is to allocate to each sensor a one bit value indicating whether it's reading exceeds a threshold (derived initially based on the statistics of the readings) or not.

Figure 4:
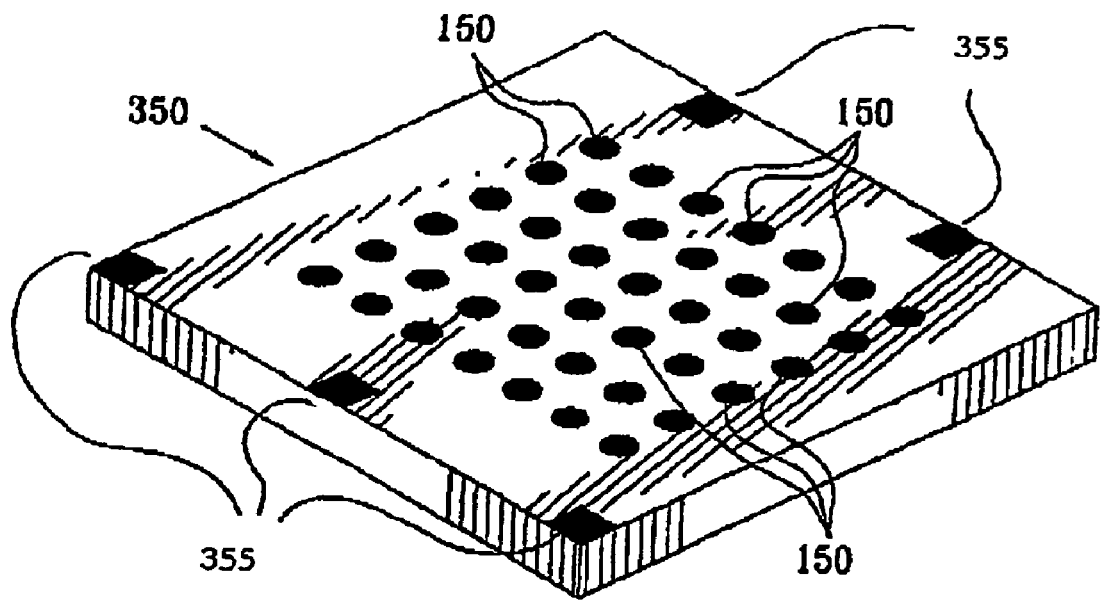
FIG. 4 is a pictorial illustration of a preferred implementation of the sensor layout of the apparatus of FIG. 1B.

FIG. 4 illustrates schematically the physical layout of the sensors, on the top of the integrated circuit chip 195 (here the chip substrate is labelled 350). Bonding pads 355 allow the chip to communicate with external components (for example through pins bonded thereto).

The sensors 150 are disposed covering all circuit-containing areas (or, at least, all areas containing sensitive data, or circuits allowing access thereto). They may be disposed, as in this embodiment, in a regular array. Some sensors 150 are also provided on the other side (not shown) of the integrated circuit, to prevent unauthorised access through the circuit. Conveniently, the sensors may be addressed though row and column lines, by applying to the desired row and column line a current or voltage insufficient on it's own, but sufficient in combination, to exceed the threshold voltage of a diode at the sensor and thus to activate only the sensor addressed by the (row, column) address.

The device is then encapsulated in an encapsulation material, which may be epoxy resin-based, and contains inhomogeneities, a parameter of which is sensed by the sensors 150 in the manners discussed below. The areas of the encapsulation 50 sensed by each sensor 150 may overlap or abut each other; the key criterion in order to prevent holes being drilled through the encapsulation to the circuit below, is that the areas sensed by the sensors leave no separation larger than the width of the smallest hole which can be drilled (for example using focussed ion beam technology). For example, the sensors may each sense an area of a few microns.

Although in the Figure the sensors are shown disposed in a regular array, they could be irregularly disposed. Groups of sensors may be provided overlying only those sensitive areas of the circuit below.

Sensors may be spaced on the order of one micron ($10^{-9}$ m) apart. Thus, to cover 1 square millimetre, $10^6$ sensors are provided.

To manufacture the device according to this embodiment, the circuit and sensors are fabricated and then the appropriate encapsulation and other packaging, and contacts to the contact pads 355 are placed around.

The sensors are fabricated in a batch with loose tolerance control, so that the sensors of one device give a different response to the same signal than those of another device (typically a different offset or gain). Thus, the sensor outputs cannot directly be predicted from the parameter values they measure, even if these could directly be measured by a hacker. Nor can measurements of sensor response from one device be used to predict the response of sensors of another.

Likewise, and for a similar purpose, the encapsulation applied differs from one device to the next; specifically, the discontinuities or inhomogeneities present within the encapsulation are distributed randomly or chaotically within each device (so that examining one part of the device cannot be used to predict properties of another), and from one device to another (so that examination of a one device will not enable prediction of the parameter values of another). Thus, when fabricating a batch of devices, care is taken to apply loose process control.

Second Embodiment—Magnetic Sensing

Figure 5B:
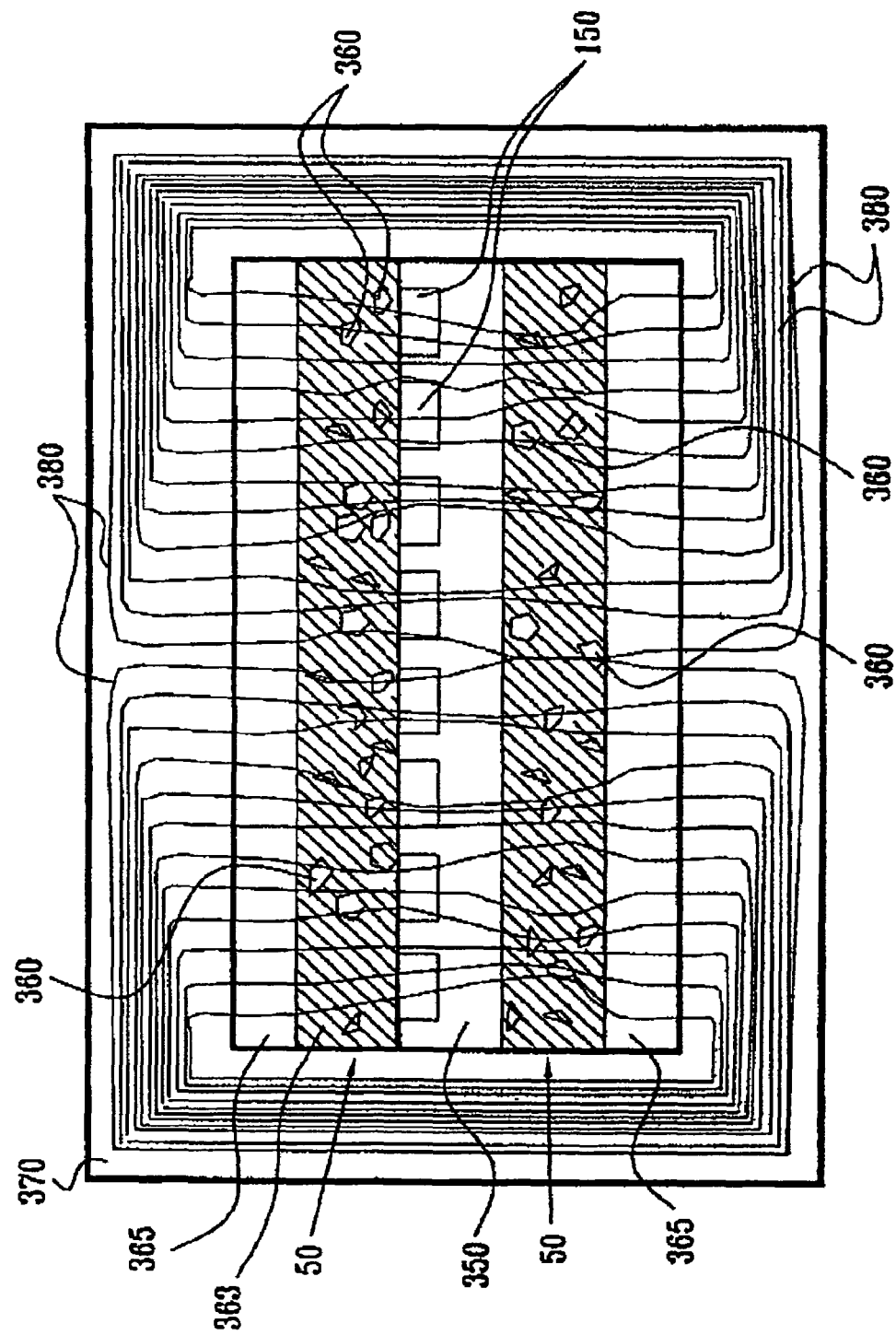
FIG. 5B is a cross-sectional illustration of the apparatus of FIG. 5A, taken at line VB—VB.

Referring to FIGS. 5a, and 5b, in this embodiment, the sensors 150 are magnetic field sensors such as Hall effect sensors, which may comprise a thin film of Indium Arsenide in an opening in the upper layer of the chip. The encapsulation 50 surrounds the device substrate 350 on both sides, and comprises an epoxy resin matrix 363. Within the matrix, a plurality of particles 360 are provided, of various sizes, shapes and/or magnetic permeabilities. These particles may be made out of Ni—Co—Fe alloy (i.e. a Ferrite alloy).

A pair of plate-shaped permanent magnets 365a, 365b are provided above and below the encapsulation layers 50, and bonded thereto by the epoxy resin 363. The magnets 365a, 365b are arranged with their poles aligned in the same direction, which in this embodiment is conveniently perpendicular to the plates 365.

Surrounding the plates 365 and encapsulation 50 is an outer casing 370 of soft magnetic core material. The effect of the casing 370 is to confine the magnetic field substantially within the casing, and to isolate it from external magnetic fields. It has a suitably high magnetic permeability ($10^3$ to $10^6$ may be found suitable). As shown in FIG. 5b, the effect of the particles 360 is to distort the magnetic field lines. Due to the non-uniformity of the distribution of the particles 360, the field lines are irregular in shape.

Thus, magnetic properties measured by the sensors 150 will generally be different at each of the sensors, as described above.

Further, any attempt to remove the outer shield 370 will itself change the distribution of the magnetic field and therefore make it impossible to read the key.

In an alternative magnetic arrangement, the local variations in the (high) permeability of randomly distributed Ferromagnetic particles is used to change the inductivity of crossing wires comprising the sensors 150.

Third Embodiment—Horizontal Resistance Sensing

Figure 6:
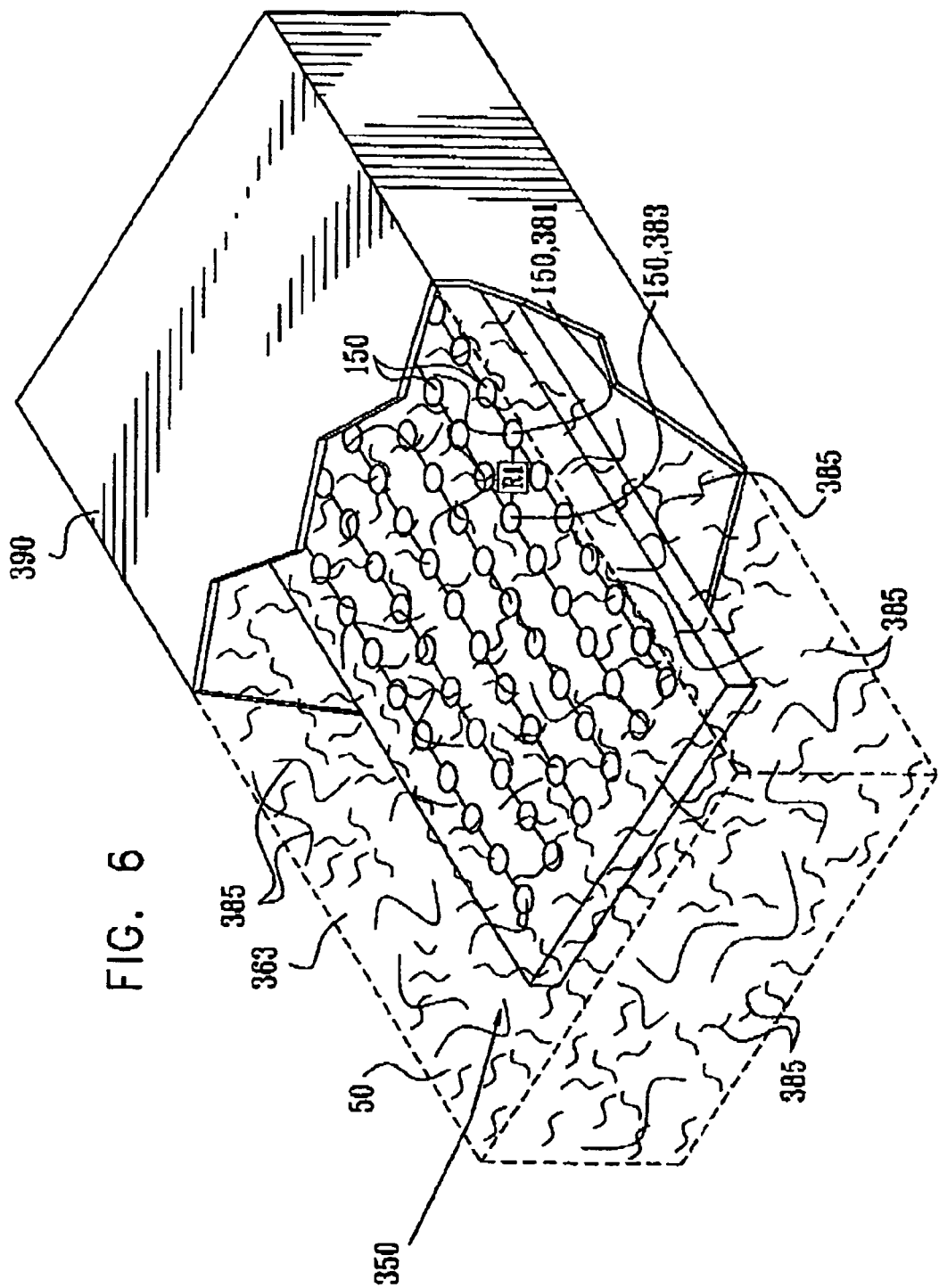
FIG. 6 is a pictorial illustration of a first electrical sensor embodiment.

FIG. 6 shows structure of an embodiment in which local variations in the resistivity of the encapsulation are used to generate the key.

In this case, the sensors 150 comprise conductive openings in contact with the encapsulation 50, and are individually connectable to a voltage supply line and to a ground line. In use, one of the sensors 381 is connected to a voltage supply line and another 383 to the earth line. The current passing through either of the sensors (provided through a current sensing resistor) provides the sensor output.

In this embodiment, the encapsulation 50 surrounds the semiconductor substrate 350 of the device.

Within the epoxy resin matrix 363, a conductive powder having a relatively high electrical resistance such as graphite is intermixed. Alternatively, semiconductive materials such as Gallium, Copper Oxide or Selenium may be used.

Additionally, conductive particles such as strands of copper wire of varying lengths, widths, shapes and/or conductivities are intermixed nonhomogeneously. To shield the device from external influences, an outer conductive metal casing 390 may be provided, bonded to the epoxy resin matrix 363.

It is thus possible in this embodiment to measure the resistance in a path through the encapsulation 50 between any pair of the sensors. Since the resistivity of the encapsulation varies due to the distribution of the particles 385, each such resistance will be different.

Because the current flows across the device through the encapsulation, any hole between sensors will change the current flowing and will alter the readings. The sensor output reading for each point in this case may conveniently be calculated as the sum of the currents measured as flowing into each of it's neighbours from the sensor, so that a point on the substrate (and the encapsulation above it) will lie within the areas to which several sensors are responsive (i.e. the areas of the encapsulation sensed by neighbouring sensors overlap).

In this embodiment, temperature variations may cause resistivity fluctuations, so the difference between pairs of resistance measurements (each one being between a pair of the sensors) are taken at a subtract node, prior to digitisation. This reduces the temperature effect. Alternatively, the ratio, or any other differential measurement, could be used.

Fourth Embodiment—Vertical Resistance Sensing

This embodiment has substantially the same structure as the last embodiment, except where differences are mentioned.

In this embodiment, within the casing 390 (which may be omitted if desired in this embodiment) an inner conductive layer 391 of, for example, aluminium is provided, in electrical contact with the encapsulation 50, and connected to the earth pin of the integrated circuit.

In this embodiment, each of the sensors 150 is selectively connectable to a supply line, via a current sensing resistor. To read the resistance of the encapsulation path directly above each of the sensors 392, 394, 396, 398, each one in turn is connected to the supply line, and the current through each flowing through the sensor and the encapsulation to the grounded metal layer 391 is measured through the current sensing resistor. In this way, resistances R1–R5 from the sensors 392, 394, 396, 398, 400 are successively measured in a scan. Again, differential measurements are preferred.

Fifth Embodiment—Capacitative Sensing

Figure 8A:
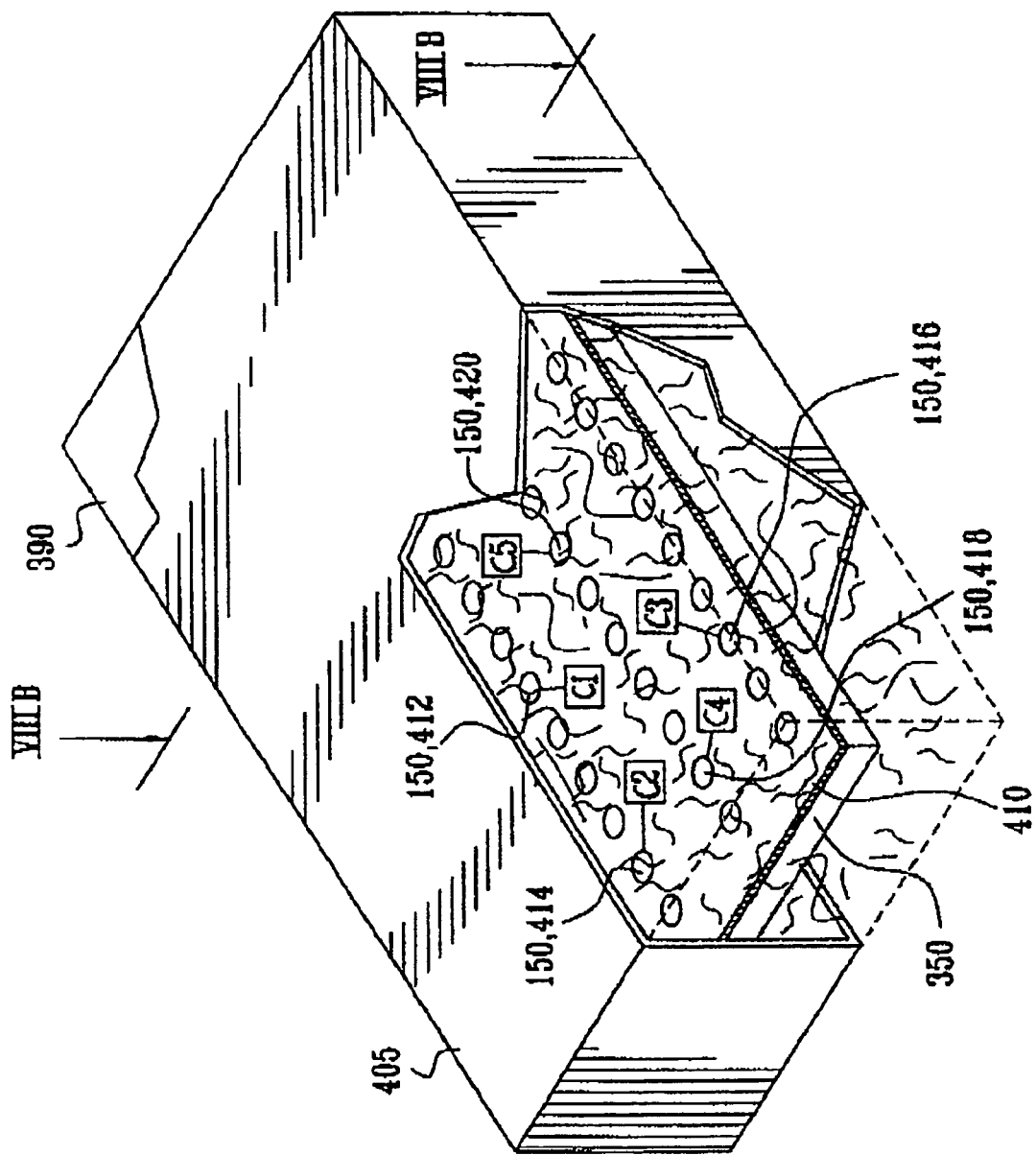
FIG. 8A is a pictorial illustration of a capacitative sensor embodiment.

FIGS. 8a and 8b show an embodiment using capacitative sensors. In this embodiment, each sensor merely comprises a contact pad below a layer 410 of insulating material, to block the passage of direct current, and a circuit for applying an alternating voltage and for measuring the current passing through the pad.

A layer 405 is grounded, as before. The layer 390 may be an outer protective casing in this embodiment. A plurality of particles 411 are provided within the resin 363. The particles are such as to change the dielectric constants of the encapsulation 50 locally.

In this embodiment, a signal with a rapidly changing component (i.e. an alternating component) is applied through each sensor 150 by the analogue multiplexer. For example, such a signal may be obtained by rapidly alternating the sensor 150 between 0 volts and supply voltage level, so as to produce a signal with an alternating component between the sensors 150 and the upper layer 390 (the direct current component will be blocked by the insulating layer 410).

The current passing through the sensor (and hence a measure of the capacitance of the material above the sensor) is measured, for example using a current sensing resistor as described above.

Sixth Embodiment—Key Holding Register

Figure 9:
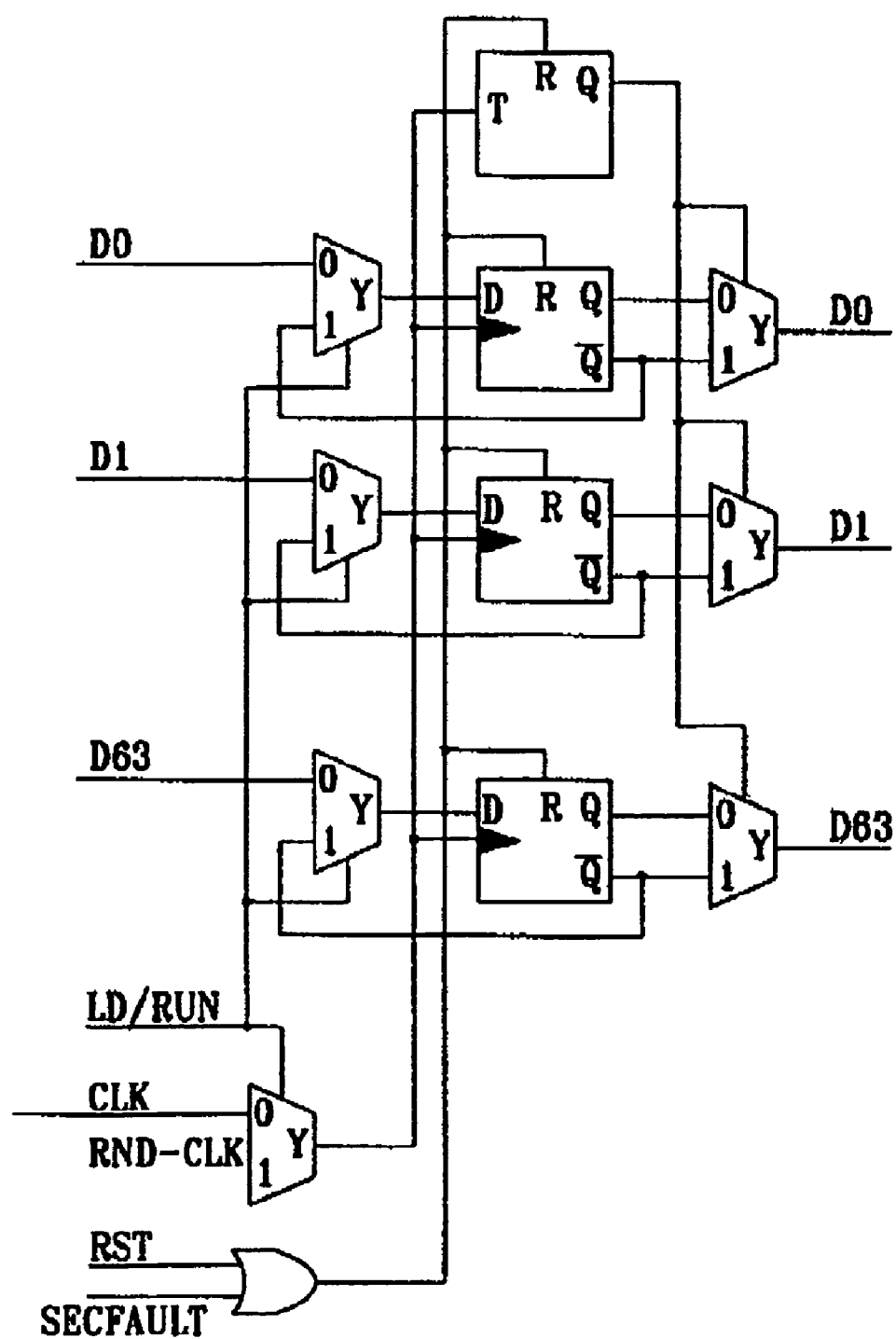
FIG. 9 is a block diagram of the elements of a key toggling register of a preferred embodiment.

Referring now to FIG. 9, a structure of the key holding register will be described which is suitable to prevent attacks by freezing the key register using radiation or cooling.

An input array of two to one multiplexers 602a, 602b, . . . 602e each receive one bit of the key at a first input port. In this case, there are 64 such two bit multiplexers.

The output of each of the multiplexers 602 goes to the data input of a respective one of a bank of D type flip flops 604a, 604b, . . . 604e. The normal (i.e. uninverted) output of each flip flop 604 goes to a respective first input of one of a second bank of two to one multiplexers 606a, 606b, . . . 606e.

Thus, the value of each bit of the key can be clocked through the first multiplexer, the D type flip flop and the second multiplexer.

The reset input of each of the flip flops 604 is connected to an OR gate 608, which receives the reset line from the CPU 100, and an input from a security fault detector (not shown). Thus, when either the CPU 100 is reset or a security fault is detected, the flip flops will be reset to erase the key.

The inverting output of each flip flop is fed forward to the second input of the respective second multiplexer 606 and to the second input of the respective first multiplexer 602.

The clock port of each of the D type flop flops is fed from a further two way multiplexer 610, a first port of which receives the CPU clock signal and a second port of which receives a random clock signal. Thus, data is clocked through the flip flops at random intervals, defeating any attempt to read the key by stroboscopic pulsing of a radiation source every second clock cycle.

A load/run line, which changes states depending on whether the chip is arranged to load data or to execute the CPU program, selects which of the two input ports of each of the first multiplexer 602 is routed to its output port.

A further flip flop 612 has its reset line connected to the output of the OR gate 608, its input connected to the output of the multiplexer 610, and its output connected to the control input of the multiplexers 606 so as to select which of the two input ports is routed to the output thereof. Thus, the flip flop 612 alternates between the genuine and inverted outputs of the bank of D type flip flops 604 each clock cycle.

The effect is to toggle each bit of the key in the register of flip flops every (random) clock cycle, whilst maintaining the key on the output ports of the bank of second multiplexers for use in en/decryption.

Seventh Embodiment—Separate Chips

In the preceding embodiments, the security features of the invention are integrated into a single integrated circuit chip with a CPU core and memory. FIG. 10 shows an embodiment which permits the present invention to be used with separate integrated circuits.

In this embodiment, a separate CPU or microprocessor unit chip 470 is provided, together with a separate non-volatile memory chip 460. In this embodiment, the memory should be writable, such as FLASH or EEPROM, as disclosed above.

Between the two is an integrated circuit 450 connected to the address and data buses of the CPU 470 and the memory 460, containing the security features of the present invention. All three are provided on a common printed circuit board 485 (shown in FIG. 11).

The sensors 150 in this embodiment are distributed over the print circuit board 485 and connected via conductors to the integrated circuit 450. They are provided on both sides of the printed circuit board 485 and also on the integrated circuit 450.

Surrounding the PCB 485 at either side is encapsulation 50 containing features 385 which may be of any of the above types, suitable to be sensed by the sensors 150.

After the chips 450, 460, 470 have been placed on the PCB 485, the encapsulation 50 is provided around and pins are added to provide electrical contact. Finally, a protective shell 480 is added to protect the encapsulation 50 from accidental damage.

As in the above described embodiments, in the factory, the device performs an initialisation operation in which the data is supplied to the device via the I/O interface, then encrypted in the key derived from the encapsulation 50, and then stored into the memory 460.

It will be clear from the foregoing that in this embodiment the circuit 450 contains all of the components other than the memory 460 and CPU 470 described in the earlier embodiments.

Thus, this embodiment enables the invention to be used with conventional or third party memory and CPU chip products without major modification thereof.

Eighth Embodiment—Self Destruct Coating

Figure 12A:
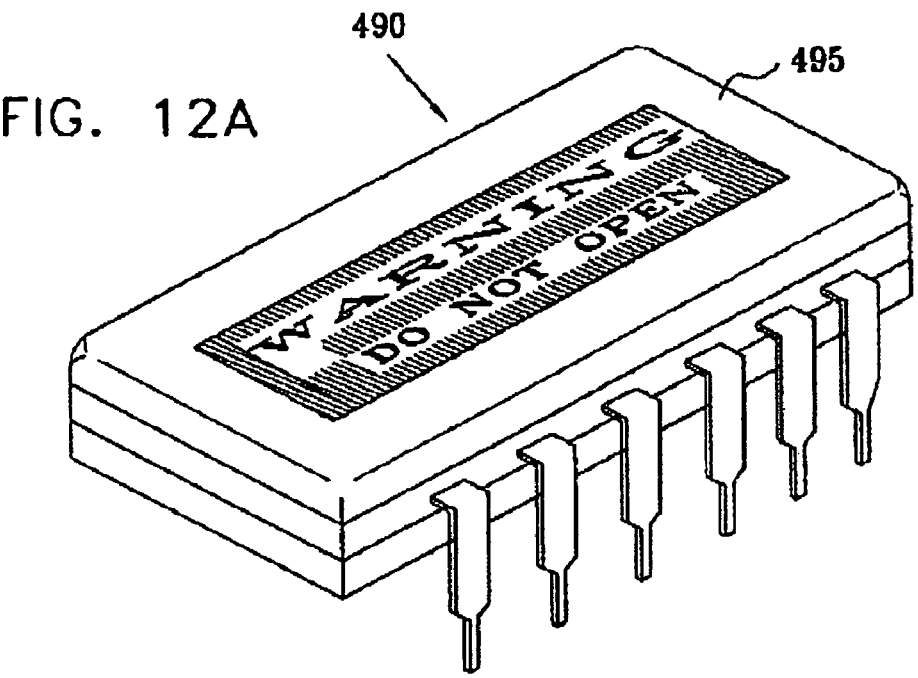
FIG. 12A is a pictorial illustration of a packaged electrical circuit assembly constructed and operative in accordance with an alternative embodiment.
Figure 12B:
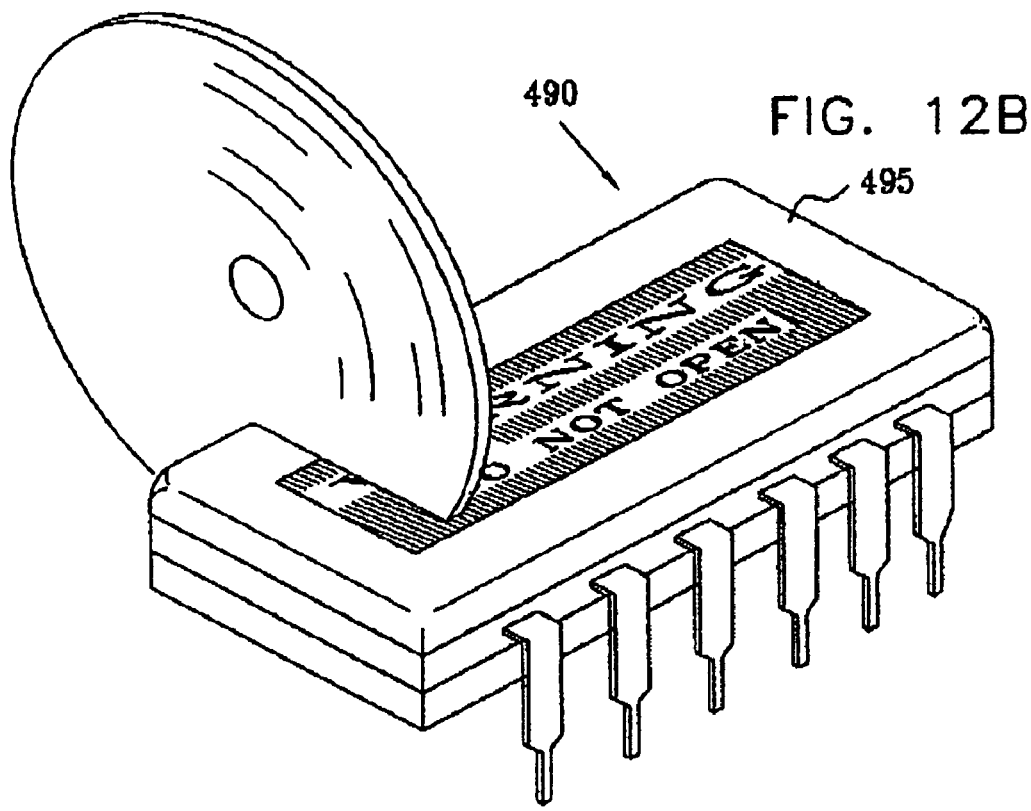
FIGS. 12B and 12C are pictorial illustrations of an act of intrusively opening the apparatus of FIG. 12A and of the effects thereof, respectively.
Figure 12C:
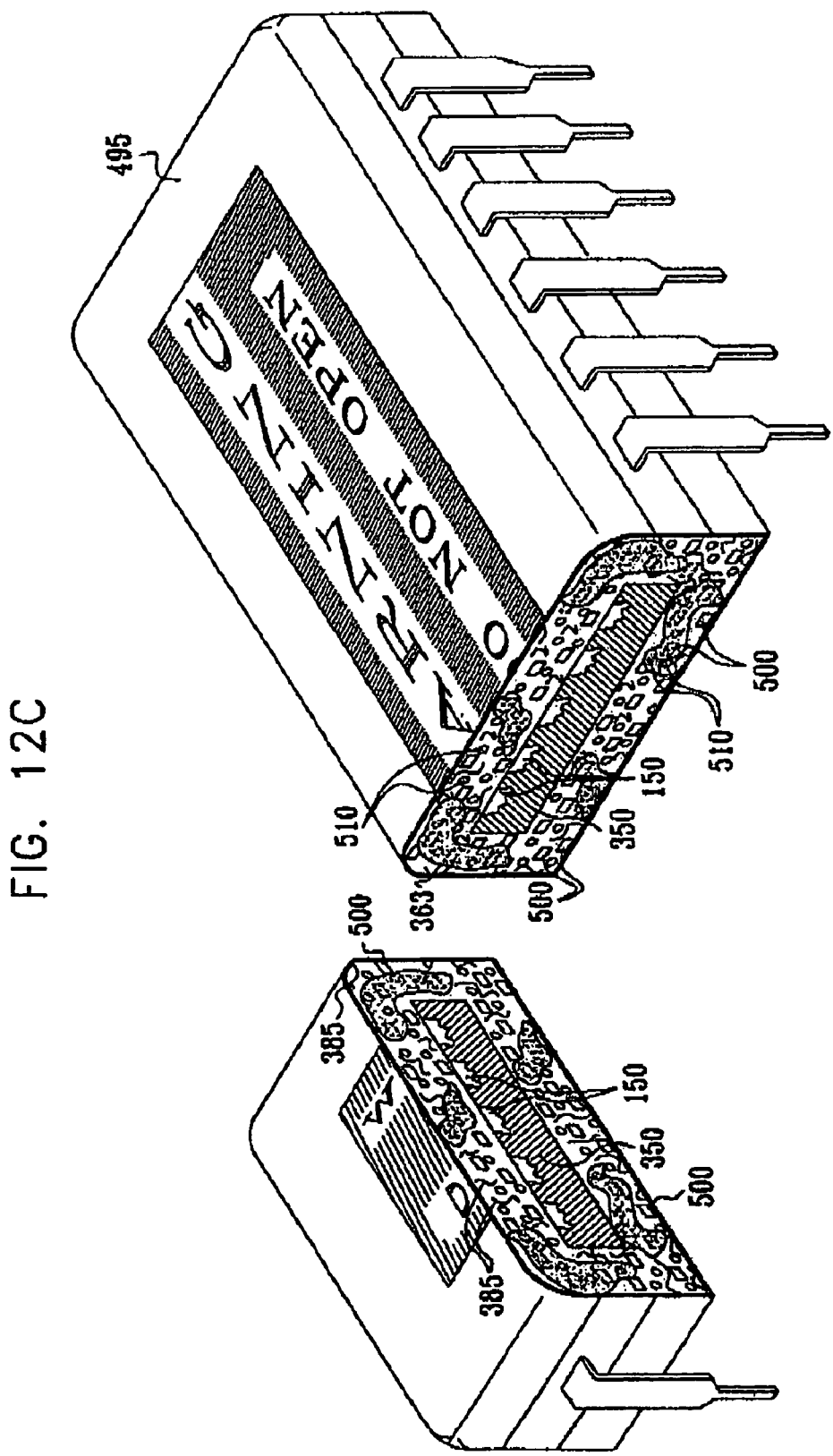

FIGS. 12A to 12C illustrate an embodiment in which the encapsulation 50 contains, in addition to a plurality of randomly distributed property-modifying particles as described in the above embodiments, a plurality of microcapsules containing one or more encapsulated substances (i.e. in liquid form). For example, capsules of first and second different substances 500, 510 may be provided, which will react together on contact to produce a chain reaction that will rupture further microcapsules.

FIG. 12B shows an attempt to mechanically open the chip encapsulation, and FIG. 12C shows that, as a result, capsules 500 and 510 are ruptured and come into contact with each other, setting off a two part exothermic reaction which then ruptures further encapsulations and thus propagates through the encapsulation 50. This produces a substantial alternation in the parameters measured by the sensors 150, destroying the encryption key.

The encapsulation should be such that the encapsulated regions will not rupture due to normal handling but will rupture readily on attempts to piece or penetrate the packaging 50. It is only necessary that the encapsulation should be substantially changed; it is not necessary that the underlying chip should also be destroyed.

Ninth Embodiment—Optical Sensor

Figure 13A:
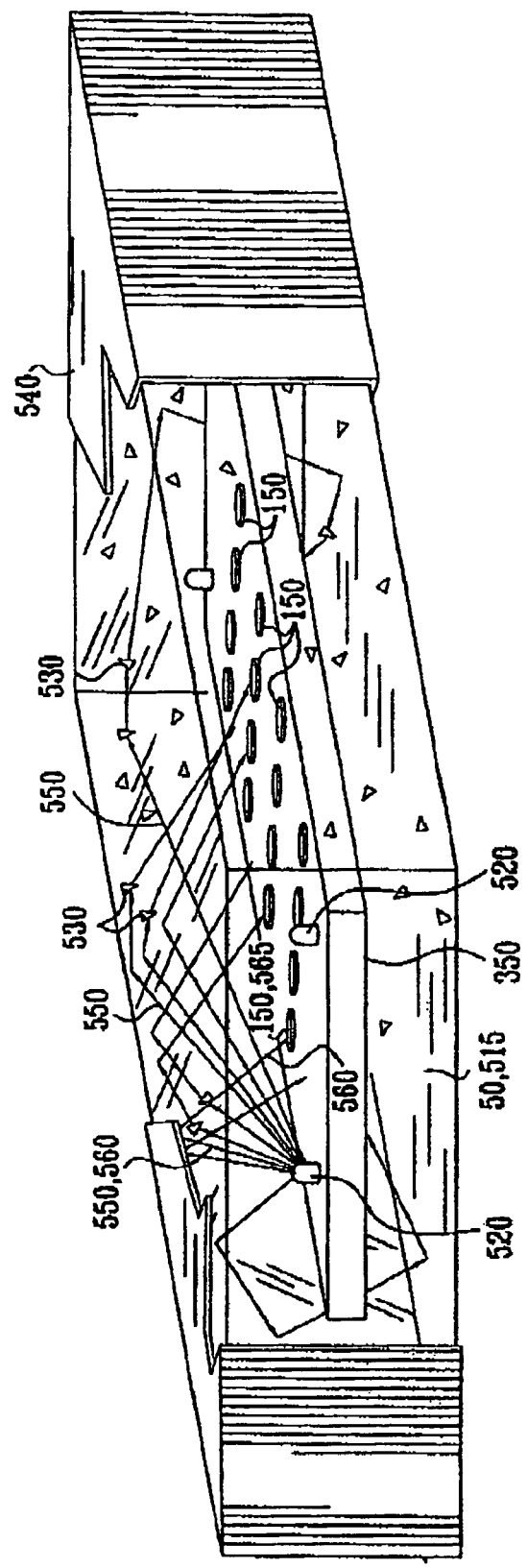
FIG. 13A is a pictorial illustration of another embodiment.
Figure 13B:
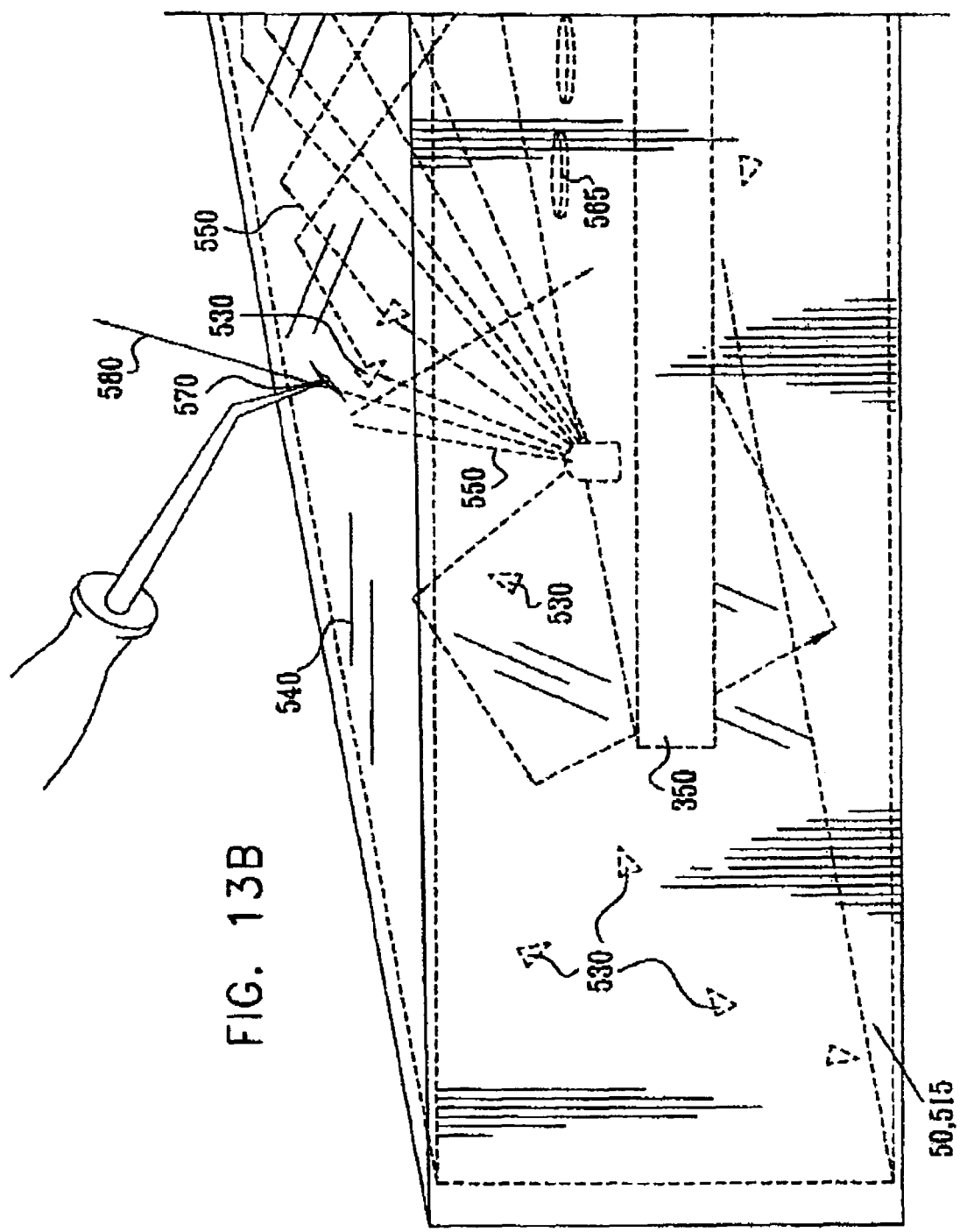
FIG. 13B is a cross-sectional illustration of a portion the apparatus of FIG. 13A, illustrating an act of intrusively opening the apparatus of FIG. 13A and the effects thereof.

Referring to FIGS. 13A and 13B, in this embodiment, the encapsulation or packaging material 50 is made of a light transmissive matrix 515 such as a polymer (e.g. epoxy, polyacryl), or alkali silicate (such as $NaSi_4$). It might alternatively comprise a crystalline light transmissive solid (e.g. a crystallised polymer).

Also provided is at least one light source 520 (shown in FIG. 13A as a plurality of light sources), positioned on the surface of the integrated circuit 350. The light sources may conveniently be light emitting diodes (LEDs). The array of sensors 150 in this embodiment are photosensors.

The polymer encapsulation 515 includes a plurality of randomly dispersed particles 530 which interact with the light emitted from the light sources 520. The particles may refract, reflect, diffract or absorb light. The light from the sources thus produces on the array of sensors 150 an interference pattern which is characteristic of the distribution of the particles and is used to produce a cryptographic key as disclosed above. The particles may be for example may be small crystal grains.

Where the matrix comprises a crystalline solid, it may include a plurality of decrystallised areas to fulfil the role of the particles 530. The decrystallised areas may be produced in a known fashion using a focused laser beam.

The encapsulation 50 of this embodiment is surrounded, preferably completely, by a bonded-on, hard outer covering 540 which is light reflective on the inside and does not allow the entry of light from the outside. Thus, the light sensed by the sensors 150 is unaffected by external light conditions.

Due to the reflectance of the hard coating 540, attempts to interfere with or remove the coating will result in changes to the light sensed by the sensors 150.

In operation, a multiplicity of light rays are emitted by the light sources 520. Rays such as the ray 560 which reach an external surface of the encapsulation 50 and an internal surface of the outer covering 540 are reflected back inwards, and will eventually reach one of the sensors (labelled 565).

FIG. 13B shows the effects of intrusively opening the apparatus. This creates an opening 570, causing rays such as the ray 560 to pass out through the opening 570 rather than be internally reflected. Thus, the environment sensed by the sensor 565 has now changed, changing the key and thus rendering decryption impossible.

Conveniently in this embodiment, each photosensor is paired with a light emitting diode, and the pairs are positioned around the periphery of the chip. Light from the diode of one pair is then sensed by the photosensors of the others.

Tenth Embodiment—Read Only Memory

In the preceding embodiments, the memory 110 has been of an electrically alterable kind, to allow each integrated circuit after fabrication to sense the parameters of its encapsulation and thus derive its unique encryption key, and then to store data in the memory 110 using that key.

This embodiment enables a read only memory (ROM), in which data has been stored prior to this initialisation operation, to be used.

Figure 1B:
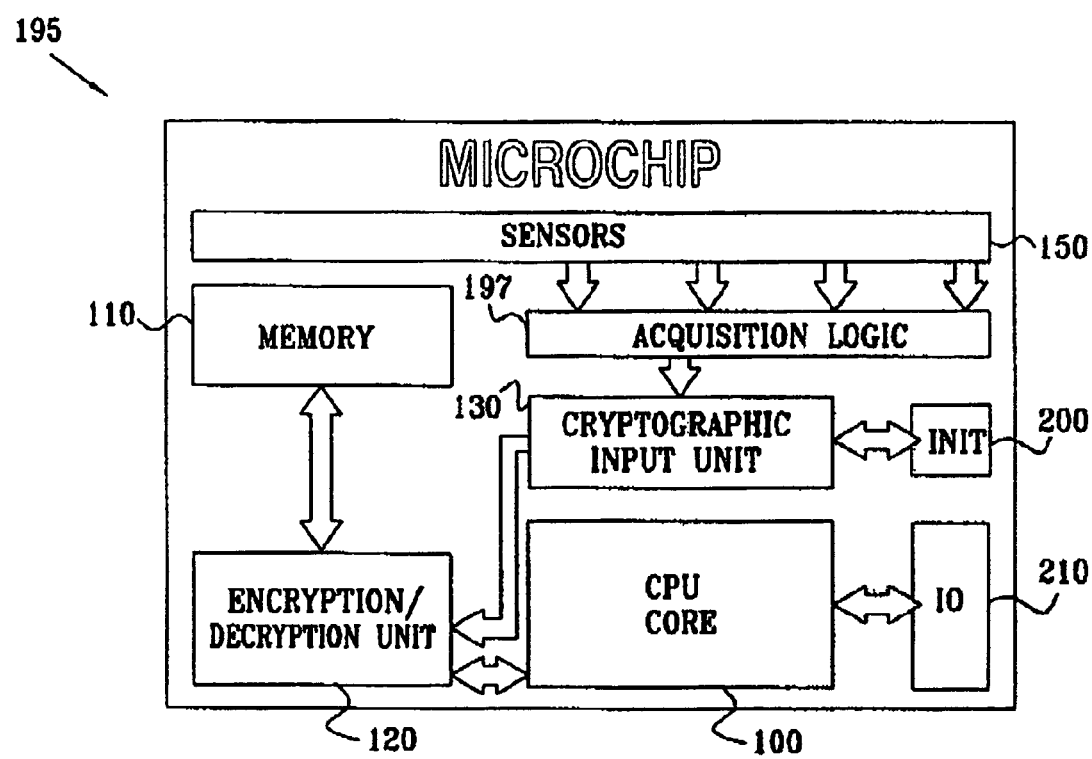
FIG. 1B is a block diagram of a preferred implementation of a portion of the apparatus of FIG. 1A.
Figure 16:
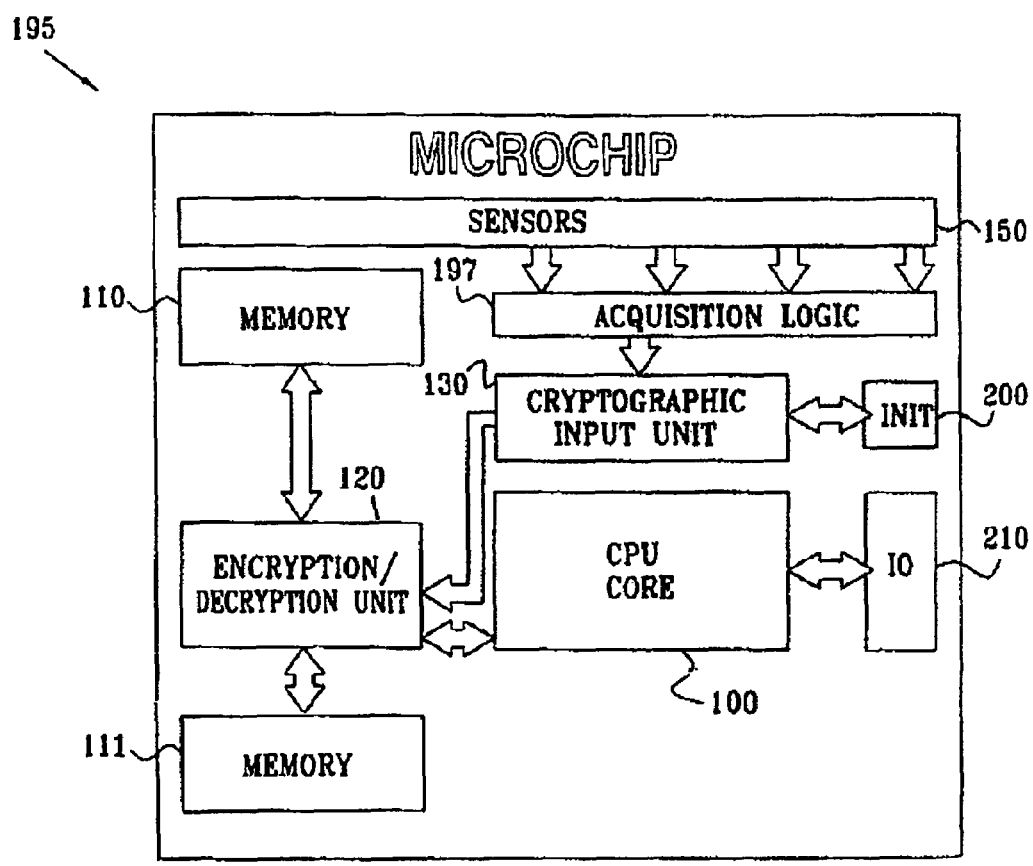
FIG. 16 is a block diagram illustrating a further embodiment of the invention using two memories.

Referring to FIG. 16, it will be seen that this embodiment is the same as that of FIG. 1B, except for the presence of an additional memory 111, and a difference in the operation of the encryption/decryption unit 120.

In this embodiment, memory 110 is a read only memory (ROM). Data is provided within the read only memory 110 in encrypted form, encrypted using a first predetermined encryption key. The first encryption key is then stored, in the clear, in the second memory 111 which is writeable, non-volatile, memory (e.g. Flash or EEPROM).

In this embodiment, on initialisation, steps 1002 and 1004 of FIG. 14 are performed. Then, the value of the predetermined encryption key (i.e. the key needed to decrypt the contents of the memory 110) is read from the second memory, and encrypted using the second key, which was formed in step 1004 (i.e. that derived from the parameters of the encapsulation). The first key encrypted under the second is then written back into the second memory 111 in encrypted form.

Each time the device is switched on subsequently, in use, the first step is to read the second memory 111 and decrypt the first key therefrom. After that, the operations of reading and writing data are substantially as described in the embodiments above. On power down, the clear text value of the first key is erased from the register in which it is held, which is also toggled as in FIG. 9 to defeat a freeze attack.

In this embodiment, the key used to encrypt or decrypt the data held in the first (ROM) memory 110 is not permanently latched or held in clear text form, so that it cannot be reading by stripping away the encapsulation.

The first key may be the same for a batch of ROMs, which may therefore be mask-programmed, leading to a cost saving. Only the key-encrypting key derived from the encapsulation need be stored in the second memory.

Eleventh Embodiment—Pairing Key

Figure 17:
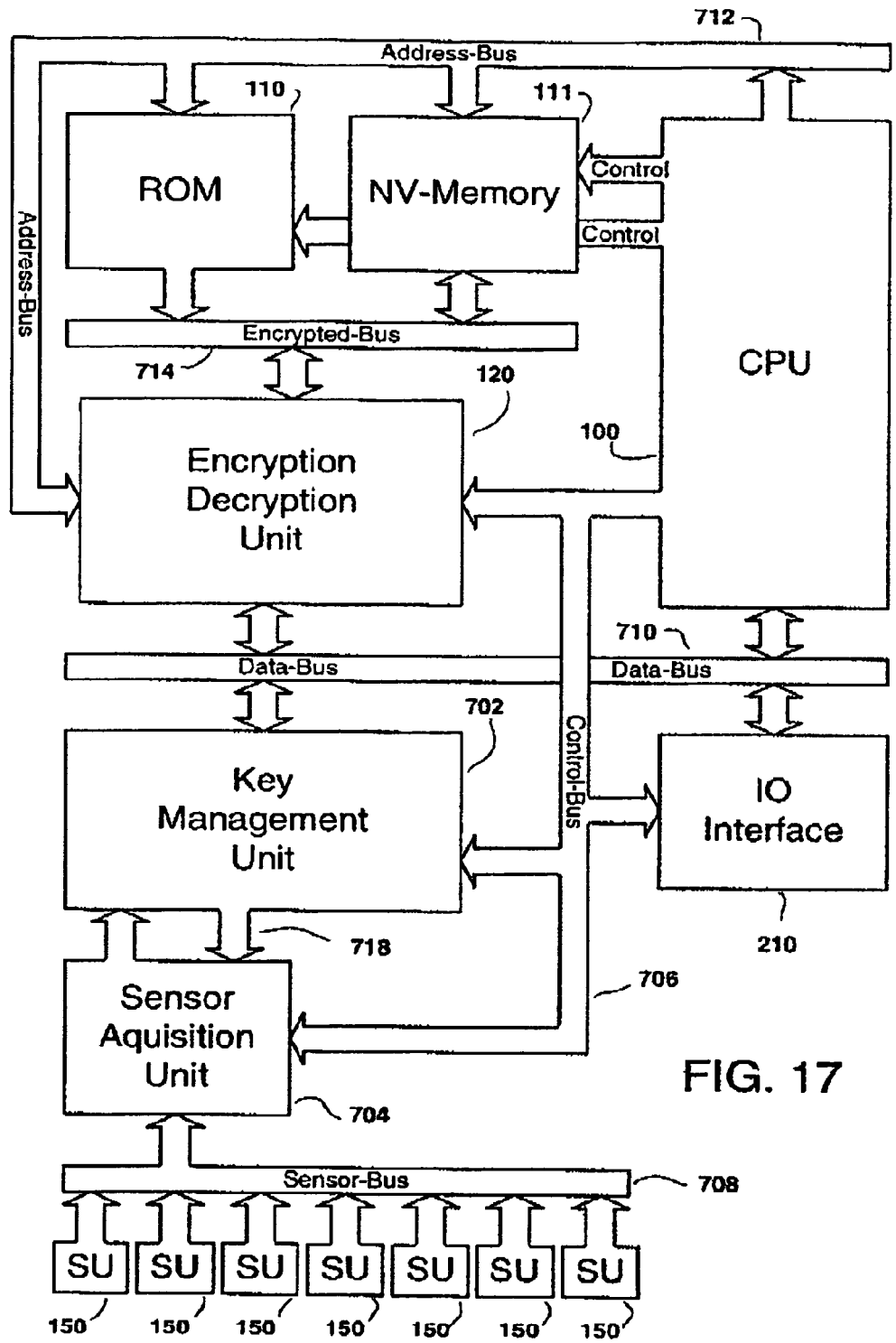
FIG. 17 is a block diagram illustrating a further embodiment of the invention using a pairing key.
Figure 18:
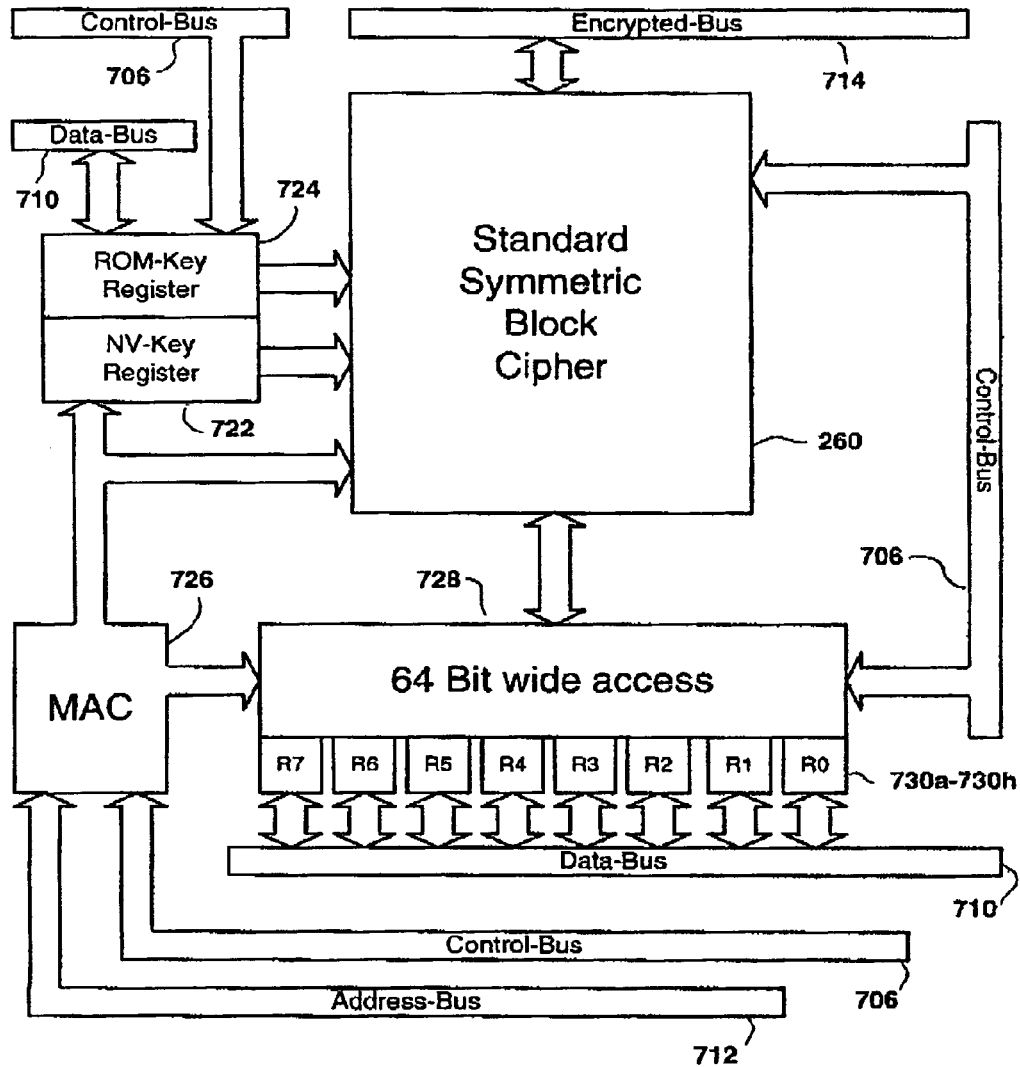
FIG. 18 is a block diagram illustrating in greater detail a portion of that embodiment.

Reference will be made to FIGS. 17 and 18, which broadly correspond to FIGS. 1B and 2 of the first embodiment, and to FIG. 19.

In this embodiment, elements similar to those of the preceding embodiments will be given the same reference numerals.

In this embodiment, as in the last, a ROM 110 is used as storage. Additionally, in this embodiment, a processor having a byte-wide (i.e. 8 bit wide) data bus is used, with 64 bit block encryption as discussed above.

Additionally, in this embodiment, security is improved by providing that the scanned values from the encapsulation are not directly used to form the key to decrypt the key for the ROM data; instead, they are combined with a second digital string, which will hereafter be referred to as the "pairing key", whilst the string of scanned values will be referred to as the "shell key". (Neither the pairing key nor the shell key are keys in a strict sense, since they are not actually used to encrypt or decrypt data themselves, but the pairing key should be generated as if it were a key). Thus, even if the scanned values could be reconstructed by a hacker, the key used to decrypt data cannot be derived without the pairing key.

In this embodiment, tampering is detected, and on such detection the pairing key is erased.

It will be appreciated that this embodiment provides additional security, and is therefore particularly useful with embodiments where the physical security is lower; it may be unnecessary in embodiments such as the magnetic or light sensing embodiments described above.

In addition to the elements disclosed in preceding embodiments, in FIG. 17 there are provided a sensor acquisition (or scanning) unit 704 which scans the signals from the sensors 150 received via sensor bus 708, and submits the digitally acquired signals 718 to a key management unit 702, which forms the keys used for encryption or decryption.

In this embodiment, the KSU 704 provides a standard interface to the KMU; that is to say, it includes all the necessary components for whichever types of sensors it is to be used with and converts their outputs to a standard digital form. Thus, any customisation of the apparatus of this embodiment for different sensor systems is concentrated only in the sensors 150 and KSU 704.

Interconnecting the components are an address bus 712; a data bus 710; a control bus 706; a key management unit bus 716; an encrypted bus 714; and a key bus 720. The control bus 706 allows the CPU 100 to signal requests to the various other functional blocks (the KSU 704, KMU 702 and the EDU 120).

FIG. 18 illustrates a portion of the apparatus of FIG. 17 comprising the EDU 120. It shows in particular the relationship between the EDU 120, the CPU 100, the memory 110 and key holding registers.

In this embodiment the EDU 120 comprises a symmetric block encryption/decryption device (operable for example to perform a DES encryption and decryption operation); a pair of key holding registers 722, 724; a column width (64 bit) dual port plaintext register 728; and a memory access control (MAC) circuit 726 (responsive to the address bus) which selects the appropriate one of the two keys held in the two key holding registers 722, 724 and causes it to be supplied to the block encryption/decryption unit 260.

Connected to each byte of the 64 bit register 728 is a respective byte wide register 730a–730h. The memory access control circuit 726 is operable to select one of the byte registers 730.

Figure 19:
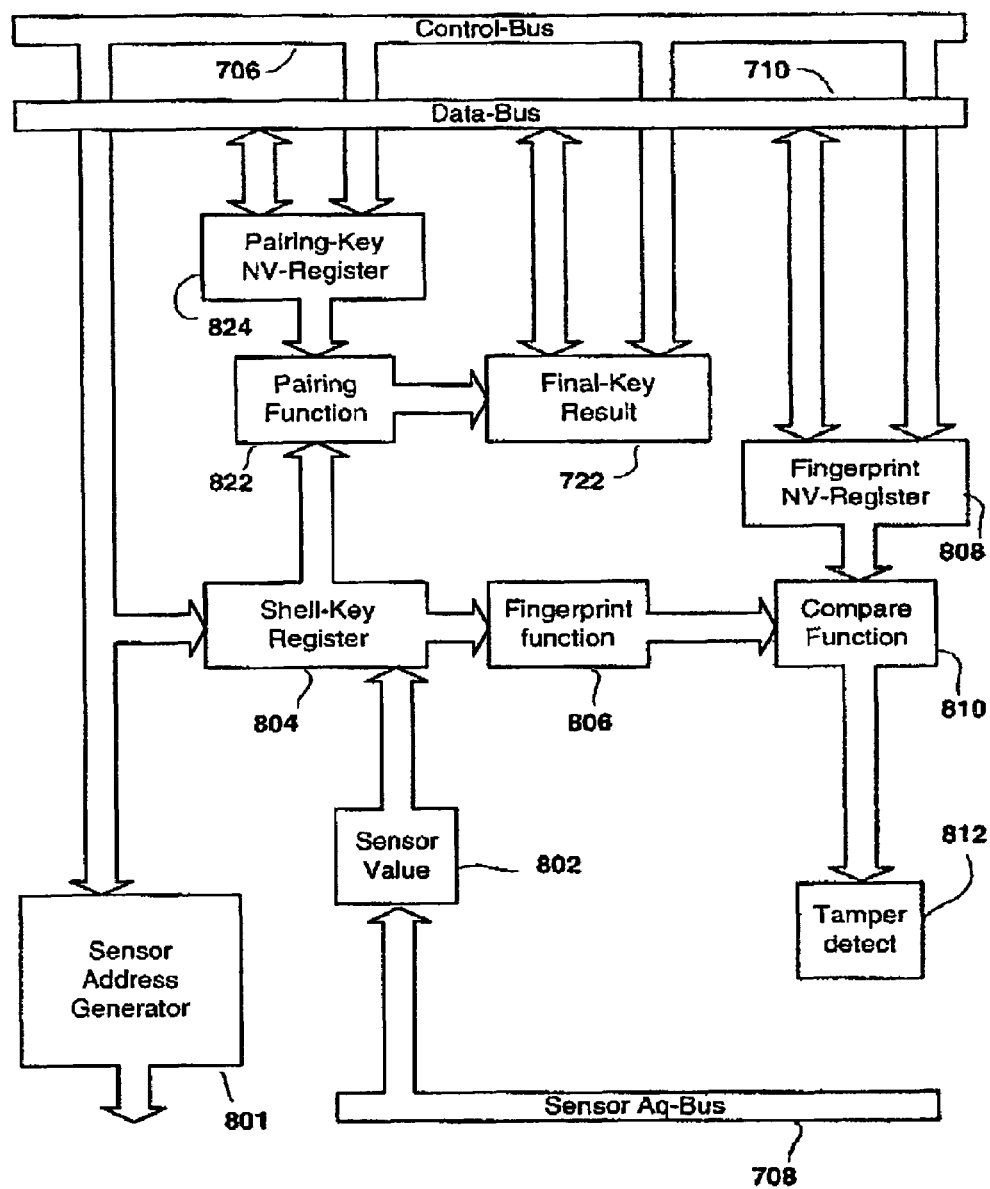
FIG. 19 is a block diagram illustrating in greater detail another portion of that embodiment.

Referring to FIG. 19, the key management unit 702 comprises a sensor address generator 801, a shell key register 804, a fingerprint register 808, and a pairing key register 824. It also comprises logic circuits performing a pairing function 822 and a fingerprint function 806, and a comparison circuit 812.

The KMU 702 stores a random number as the pairing key, in an erasable register (i.e. non-volatile memory) 824. The random number is unique to each device of a batch and is supplied through the I/O circuit on initialisation and stored in the register by the loader program.

Within the second key register 724 is the key which was used to encrypt the data held in the ROM 110, which is supplied through the I/O circuit on initialisation and stored initially in clear form in the register 724.

On initialisation, as in the preceding embodiment, to cause the loading of the shell key, the CPU raises a signal on the control bus 706 to cause the KSU 704 to scan the encapsulation properties. The KSU then receives measurement values 802 from the sensor units 150 over the sensor bus 708, and transmits these to the key management unit (KMU) 702. where they are stored in the (non-volatile, erasable) Shell Key Register 804 which, as in preceding embodiments, alternates the data to prevent a "freezing" attack.

Next, a "fingerprint" characterising the measurement values is calculated from the contents of the Shell Key Register 804, by the fingerprint function circuit 806; the fingerprint function is a function which combines the measurements in a manner which does not depend on their order and may conveniently be the sum of the measurements. The calculated fingerprint is stored in the (non-volatile, erasable) Fingerprint register 808, where it will remain throughout use of the device (unless tampering is detected).

Next, the final key to be used is calculated from the contents of the Shell Key Register 804 and the pairing key register 824 using, for example, an XOR combination operation and stored in the final key register 722 where it will remain until power is removed from the device, at which point it will be erased. As in preceding embodiments, this register alternates the data to prevent a "freezing" attack. Where necessary, it will be accessed by the EDU over the KMU bus 716.

Finally, the key to the ROM, which was initially stored in the clear in register 724, is retrieved and encrypted under the final key from register 722, and stored back in the register 724 in that encrypted form, where it will remain until power is removed from the device, at which point it will be erased. This register also alternates the data to prevent a "freezing" attack.

On each subsequent occasion when the device is powered up, the CPU 100 causes the re-acquisition of the sensor values, performs a fingerprint check, recalculates the final key, and re-encrypts the ROM key.

During normal operation of the device, the acquisition unit 704 scans the sensors 150 relatively frequently (at intervals shorter than the time taken to penetrate the encapsulation, for example every second). The sensor address generator 801 calculates a different sequence of sensor readings before each new scan, so that the order of scanning is frequently varied. However, the scanned values themselves should be the same from in each scan, albeit presented in a different order.

The KMU 704 is arranged, after each scan of the sensor bus 708, to compare the measured encapsulation properties with the fingerprint, by applying the fingerprint function 806 to the contents of the shell key register 804 and comparing the results with the contents of the fingerprint register 808.

In the case of mismatch (which would indicate tampering with the encapsulation) the tamper detection circuit 812 sends a signal to the CPU indicating an alarm condition, and the CPU sends an alarm signal on the control bus 706 to cause the KSU, KMU and EDU to erase the pairing key from the pairing key register 824. Although this may in itself be sufficient, the contents of the shell key register 804, fingerprint register 808 and encryption key registers 722, 724 are also erased.

The read and write operation of this apparatus will now briefly be described; except where stated below, this embodiments operates in generally the same fashion as the first.

During a byte read cycle, the 64 bit column which includes the byte requested by the CPU is supplied in the (64 bit wide) encrypted bus 714 to the encryption/decryption circuit 260. If the memory access control circuit 726 detects that the address lies within the address space of the writeable memory 111, the first key register 722 is selected and used for data decryption; otherwise, if it lies within the address space of the read only memory 110, the first key register 722 is selected and then the second key register 724 is selected and the final key is used to decrypt the ROM key which is then used for data decryption.

The decrypted 64 bit word is written by the block encryption unit 260 to the plaintext register 728. In response to the row portion of the address placed on the address bus 712, the memory access control circuit 726 selects the appropriate one of the registers 730a–h which contains the byte requested by the CPU 100 and causes the selected register to load that byte onto the data bus 710 for reading by the CPU 100.

As in the preceding embodiments, performing a write operation (to the non-volatile memory 111, since the ROM cannot be written) requires a read operation first, as data is encrypted in larger blocks than those used by the CPU 100. Accordingly, after the plain text of a column is available in the plaintext register 728 (following the read step as discussed above), the memory access control circuit 726 places the byte to be written by the CPU 100 from the data bus 710 into the appropriate one of the byte wide registers 730a–730h and thence it is overwritten over the corresponding 8 bits within the plaintext register 728.

The block encryption circuit 260 then encrypts the contents of the plaintext register 728 using the current key, and the column is written back to the non-volatile memory 111 on the encrypted bus 714.

The effect of this embodiment is best understood by comparison with the first embodiment. If, in the first embodiment, it were possible for a hacker to cut a small hole down to the CPU 100, it might in principle then be possible to read out the sensor values. The drilling should have caused some change in properties locally, so that readings from a few sensors will have changed, but readings from many of the others may not have done so. It might then be possible for a hacker to mount a "brute force" attack by trying all values of the few changed bits.

By contrast, in the present embodiment, merely reading the parameter values from the sensors is of no assistance in inferring the remaining bits of the key, since these are combined with the pairing key, which will be erased where tampering is detected.

Even if it were possible for a hacker to drill a hole and log the scanned measurements carried over the data lines during a sensor scan operation, the permutation of the scan order means that he will not know where, in the sequence of measurement readings which go to make up the key, the corrupted bits (which are to be subject to a "brute force" attack) should go, so that the task of mounting such an attack is increased by the permutation of scanning order.

Other Sensors and Parameters

It will be appreciated that various other parameters or properties could be sensed.

In another embodiment, radiation is used as the sensed property. The epoxy resin of the encapsulation 50 is mixed with a small amount of particles which transmit beta rays (e.g. particles of radioactive isotopes such as uranium).

As the mixture surrounds the circuit, the beta rays will arrive from all sides of the chip. The sensors are beta detectors (which may be x-ray detectors) placed at many locations. The detectors will receive a complex pattern of beta rays generated by the chip case. As before, any attempt at penetration will change the key produced from the sensors radiation levels.

The amount of radiation generated will be less than naturally occurring cosmic rays. However, for additional safety, the chip may be surrounded with some radiation absorbing substance, such as a thin layer of lead, or a layer of epoxy mixed with Barium Sulphate.

In another embodiment, varying particles of ferroelectric materials, as used in ferroelectric RAM technology, may be provided in the matrix of the layer 50, and an electric field applied across the layer 50 by plate electrodes. The field is modified locally by the particles, and this can be sensed by sensors similar to those used in the capacitative embodiment above.

In a yet further embodiment, varying particles of magnetised ferromagnetic materials may be used to generate a set of local magnetic fields sensed by Hall effect sensors.

Instead of Hall effect sensors, spin valve transistors (which can be made on a very small scale) could be used.

One desirable feature of whatever sensed parameter is to be used is that alteration of the encapsulation should affect all sensor readings in the same direction.

Thus if, for example, the key is derived from the sum (or several sums) of sensor readings, an attempt to remove the encapsulation will definitely change the key value. If the effect of, for example, reducing the thickness of the encapsulation were to increase some readings and decrease others then the key might in principle remain unchanged, which would be undesirable.

OTHER EMBODIMENTS

Although the derivation of a key has been described, other cryptographic data such as a seed to a cryptographic algorithm, a cryptographic algorithm; or a portion of any of these may be used.

Although symmetric encryption has been disclosed, it will be appreciated that it would be possible to use non-symmetric encryption and decryption. In this case, different keys would be providing for encryption and decryption.

Although in the above disclosed embodiments, the circuits shown are capable of both encryption and decryption, it would be possible in some applications merely to provide decryption within the device if data is only to be read from memory.

Whilst particular examples of components and materials have been given, it will be understood that any suitable components and materials could be used and the description is not intended to be limited to the components described above.

Whilst particular encryption schemes have been described above, the invention is not intended to be limited to any such schemes. Further, whilst encryption schemes using separate keys and algorithms have been described, it will be understood that the present invention is applicable to any form of encryption or enciphering, provided that data controlling some aspect of the encryption process is derived from properties of the protective memory surrounding the device.

The circuits employed could be based on Silicon, or on III–V materials such as Gallium Arsenide. Whilst electronic circuits are described above, application of the invention to optoelectronic circuits or optical circuits or other circuits (for example molecular computing circuits) is not excluded.

Whilst integrated circuits are illustrated, it will be clear that the separate components might be combined in various sub-combinations each separately integrated. Equally, it will be clear that various compnonets of the invention could be implemented either as discrete logic circuits, or as integrated dedicated logic circuits, or as programs executing under control of a microcomputer or microcontroller or DSP core.

It will be realised that the features of various of the above described embodiments can be combined. Protection is sought for any and all new subject matter disclosed herewith, whether or not the subject of the appended claims.

We claim:

1. An integrated circuit device comprising:
   a protective member which reduces access to the device;
   one or more sensors for sensing one or more physical parameters from the protective member; and
   a circuit which encrypts and decrypts protected data,
   wherein the circuit is adapted to derive encryption values from the one or more physical parameters sensed, the encryption values being essential to the process of encrypting and decrypting the protected data, such that tampering with the protective member to gain access to the circuit corrupts the encryption values.

2. A device according to claim 1, in which the circuit comprises a memory in which protected data is stored in encrypted form.

3. A device according to claim 1, in which the circuit comprises bus lines for connection to a separate memory device.

4. A device according to claim 2 or 3, in which said memory is read-only, and said circuit comprises a decryptor arranged to apply a decryption algorithm to data read therefrom.

5. A device according to claim 2 or 3, in which said memory is writeable, and said circuit comprises an encryptor arranged to apply an encryption algorithm to data to be protected to be written thereto.

6. A device according to claim 2 or 3, in which said memory comprises at least a first memory and a second memory, and said first memory stores data encryption to be used to decrypt data stored in said second memory, and said circuit is responsive to the parameter to decrypt the contents of the first memory.

7. A device according to claim 1, in which the protective member comprises an encapsulation around the circuit.

8. A device according to claim 1, in which the circuit comprises an encryptor arranged to apply an encryption and/or decryption algorithm to data to be protected or said protected data.

9. A device according to claim 1, wherein said protective member includes at least one decrystallised portion of a crystalline solid.

10. A device according to claim 1, further comprising tamper-detection logic, responsive to an attempt to gain access to the circuit to generate a tamper signal.

11. A device according to claim 1, in which the circuit is jointly responsive both to said physical parameter and to predetermined secret encryption data to apply the encryption and/or decryption.

12. A device according to claim 11, further comprising tamper-detection logic, responsive to attempt to gain access to the circuit to generate a tamper signal.

13. A device according to claim 12, in which the circuit is arranged to erase the predetermined secret encryption data in response to the tamper signal.

14. A device according to claim 1, further comprising a shield surrounding the protective member, and arranged to reduce the effects of external conditions on the physical parameter.

15. A device according to claim 1, further comprising at least one sensor responsive to said protective member, from which said at least one parameter can be derived by said circuit.

16. A device according to claim 15, further comprising a plurality of sensors to sense said at least one physical parameter.

17. A device according to claim 16, in which said sensors are disposed in an array over at least part of said circuit.

18. A device according to claim 17, in which the inter-sensor spacing is on the order of a micron.

19. A device according to claim 16, farther comprising a scanning circuit arranged to periodically read said sensors.

20. A device according to claim 19, in which said scanning circuit is arranged to vary the order of reading said sensors.

21. A device according to claim 19, further comprising a checking circuit arranged to check whether the outputs of said sensors correspond to previous values thereof.

22. The device according to claim 1, wherein said altering of the encryption and/or decryption process occurs regardless of a power state of said device.

23. The device according to claim 1, wherein the tampering alters one or more one or more physical parameters, resulting in the inability to derive said encryption values used to decrypt said protected data.

24. An integrated circuit device comprising:
a protective member which reduces access to the device;
one or more sensors for sensing one or more physical parameters from the protective member; and
a circuit which encrypts and decrypts protected data,
wherein the circuit is adapted to derive encryption values from the one or more physical parameters sensed, the encryption values being essential to the process of encrypting and decrypting the protected data, such that tampering with the protective member to gain access to the circuit corrupts the encryption values,
in which the circuit comprises an encryptor arranged to apply an encryption and/or decryption algorithm to data to be protected or said protected data and
in which said encryptor is arranged to use an encryption key, and to the circuit is arranged to derive said key from said parameters.

25. A device according to claim 1, in which said parameter is an electrical parameter.

26. A device according to claim 1, in which said parameter is a magnetic parameter.

27. A device according to claim 1, in which said parameter is an optical parameter.

28. A device according to claim 1, in which said parameter is a radiation parameter.

29. A device according to claim 1, wherein said protective member includes a plurality of particles to which said circuit is responsive, within a matrix material.

30. A device according to claim 29, wherein said particles are metallic.

31. A device according to claim 29, wherein said particles are radioactive.

32. A device according to claim 29, wherein said matrix allows passage of radiation, and said parameter is an optical property affected by said particles.

33. A device according to claim 32, in which said particles are radiation-producing.

34. A device according to claim 32, in which said particles are radiation-absorbing.

35. A device according to claim 32, in which said particles are radiation-scattering.

36. An integrated circuit device comprising a memory in which data is stored in encrypted form, and a circuit for encrypting and/or decrypting to write and/or read the data, the circuit comprising a key register storing a key for use in said encryption and/or decryption process, and an alternation circuit arranged to vary the data stored in the key register at frequent intervals.

* * * * *